US012393716B2

(12) United States Patent
Yan et al.

(10) Patent No.: US 12,393,716 B2
(45) Date of Patent: Aug. 19, 2025

(54) USER DATA MANAGEMENT METHOD AND RELATED DEVICE

(71) Applicant: HUAWEI TECHNOLOGIES CO., LTD., Shenzhen (CN)

(72) Inventors: Xueqiang Yan, Shanghai (CN); Mingyu Zhao, Shanghai (CN); Jianjun Wu, Shenzhen (CN); Min Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 18/514,095

(22) Filed: Nov. 20, 2023

(65) Prior Publication Data

US 2024/0086562 A1    Mar. 14, 2024

Related U.S. Application Data

(63) Continuation of application No. PCT/CN2022/086983, filed on Apr. 15, 2022.

(30) Foreign Application Priority Data

Jun. 4, 2021 (CN) .......................... 202110627247.6

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01)

(58) Field of Classification Search
None
See application file for complete search history.

(56) References Cited

U.S. PATENT DOCUMENTS 11,552,799 B1 *  1/2023  Parikh ................... H04L 63/102
11,665,172 B2 *  5/2023  Khaund .............. G06F 16/2379
726/4
(Continued)

FOREIGN PATENT DOCUMENTS

CN          111327568 A      6/2020

OTHER PUBLICATIONS

International Search Report issued in corresponding International Application No. PCT/CN2022/086983, dated Jul. 11, 2022, pp. 1-9.

*Primary Examiner* — Venkat Perungavoor
(74) *Attorney, Agent, or Firm* — HAUPTMAN HAM, LLP

(57) ABSTRACT

Embodiments of this application provide a user data management method and a related device, to improve user data security. The method includes: A data request device sends a first request to a blockchain platform, where the first request indicates that the data request device needs to access a data storage device. The data request device receives first permission information sent by the blockchain platform, where the first permission information indicates whether the data request device has permission to access the data storage device, and the permission is related to signature information of the data request device, an access type, and an operator public key; and sends a second request to the data storage device if the first permission information indicates that the data request device has the permission to access the data storage device, where the second request includes an access address and an operator private key signature.

11 Claims, 15 Drawing Sheets

(51) Int. Cl.
*H04L 67/306* (2022.01)
*G06F 21/64* (2013.01)
*G06F 21/71* (2013.01)
*H04L 67/303* (2022.01)

(56) References Cited

U.S. PATENT DOCUMENTS

| | | | |
|---|---|---|---|
| 12,061,722 B1* | 8/2024 | Pena | H04L 9/50 |
| 12,225,135 B2* | 2/2025 | Yasuda | H04L 9/50 |
| 2022/0051192 A1* | 2/2022 | Cheng-Shorland | G06V 30/418 |
| 2022/0179988 A1* | 6/2022 | Andreina | G06F 21/6218 |
| 2022/0311613 A1* | 9/2022 | Barakat | G06Q 40/06 |
| 2023/0010786 A1* | 1/2023 | Korwin-Gajkowski | H04L 63/10 |
| 2023/0024635 A1* | 1/2023 | Yasuda | H04L 9/3231 |
| 2024/0070791 A1* | 2/2024 | Jeong | H04L 63/00 |
| 2024/0104241 A1* | 3/2024 | Omori | G06F 21/62 |

\* cited by examiner

2G/3G/4G/IMS user data architecture 5G user data management architecture

USER DATA MANAGEMENT METHOD AND RELATED DEVICE

CROSS-REFERENCE TO RELATED APPLICATIONS

This application is a continuation of International Application No. PCT/CN2022/086983, filed on Apr. 15, 2022, which claims priority to Chinese Patent Application No. 202110627247.6, filed on Jun. 4, 2021. The disclosures of the aforementioned applications are hereby incorporated by reference in their entireties.

TECHNICAL FIELD

Embodiments of this application relate to the data processing field, and in particular, to a user data management method and a related device.

BACKGROUND

User data management is one of core functions of a mobile communication network. Provision of subscriber services and normal operation of the network depend on a user data management entity and related processes. A user data management entity of a mobile network stores user and service subscription related data, key information, and the like. The user and service subscription related data, the key information, and the like are the key to user authentication, authorization, and access control.

In current 2G to 5G core network architectures, each user has a lot of information, such as subscription information, key information, and service information. The user information is processed together in a centralized single-point user data management device. The user data management device is connected to another control panel network entity or application server, to provide services such as data access and access. For example, in a core network architecture of a 5G network, user information is managed by unified data management (Unified Data Management, UDM). The UDM manages network user data in a single element and may be paired with a user data repository. The user data repository stores the user information. The UDM is located on a control plane and is used for communication between a user plane and the control plane. In addition, encryption methods used for data transmission between the user data management device and the user data repository are usually asymmetric encryption and symmetric key encryption.

Because the user information is managed by the centralized single-point user data management device, there is a risk of single-point failure and network attack, and therefore there is a high data security risk. In addition, an encryption method used for data transmission between the user data management device and the user data repository has low security, and an asymmetric encryption algorithm has disadvantages of low efficiency, long encryption time, and a low encryption speed, and cannot determine validity and integrity of a public key. The biggest disadvantage of symmetric key encryption is that it is difficult to realize secure transfer of shared keys.

SUMMARY

Embodiments of this application provide a user data management method and a related device, to improve user data security.

A first aspect of an embodiment of this application provides a user data management method. The method is applied to a user data management system to manage user data. The system includes a data request device, a data storage device, and a blockchain platform. When the data request device needs to access the data storage device, the user data management system performs a corresponding operation. Specifically, the method includes: The data request device sends a first request to the blockchain platform, where the first request indicates that the data request device needs to access the data storage device, and the first request includes signature information of the data request device, an access type, and an operator private key signature. The data request device receives first permission information sent by the blockchain platform, where the first permission information indicates whether the data request device has permission to access the data storage device, the permission is related to the signature information of the data request device, the access type, and an operator public key, and the operator public key uniquely corresponds to an operator private key. The data request device sends a second request to the data storage device if the first permission information indicates that the data request device has the permission to access the data storage device, where the second request includes an access address and the operator private key signature.

In this possible implementation, before accessing the data storage device, the data request device needs to obtain confirmation of the blockchain platform that the data request device has the corresponding permission. Because the blockchain platform has features such as decentralization and untamperability, the blockchain platform with authentication and authorization functions has no risk of a single-point failure, and few data is lost when the blockchain platform suffers from a distributed denial of service attack. Therefore, user data has higher security. In addition, information transmitted between the data request device, the data storage device, and the blockchain platform is signed by a key of an operator, so as to ensure information security.

In a possible implementation of the first aspect, the access type includes data writing and data reading. If the access type is data writing, the first request further includes an access address and a user public key. If the access type is data reading, the first permission information includes the access address and a user public key.

In a possible implementation of the first aspect, after the data request device sends the second request to the data storage device, the method further includes: The data request device receives acknowledgment information sent by the data storage device, where the acknowledgment information indicates that the data storage device has executed a task corresponding to the second request.

In this possible implementation, the data request device is enabled to learn whether the data storage device has executed the task corresponding to the second request, so that a corresponding response can be made accordingly. This increases information obtaining of the data request device.

In a possible implementation of the first aspect, before the data request device sends the first request to the blockchain platform, the method further includes: The data request device receives a third request sent by user equipment, where the third request indicates the data request device to send the first request to the blockchain platform, and the third request includes the user public key.

In this possible implementation, the user public key of the user equipment is signed by using the key of the operator. This ensures information security.

In a possible implementation of the first aspect, the signature information of the data request device includes signature information of the user equipment.

In a possible implementation of the first aspect, the first permission information includes the user public key, and before the data request device sends the second request to the data storage device, the method further includes: The data request device determines a symmetric encryption key based on the user public key and the operator private key.

In a possible implementation of the first aspect, the acknowledgment information includes encrypted user data, and the method further includes: The data request device decrypts the encrypted user data based on the symmetric encryption key.

A second aspect of an embodiment of this application provides a user data management method. The method is applied to a user data management system to manage user data. The system includes a data request device, a data storage device, and a blockchain platform. When the data request device needs to access the data storage device, the user data management system performs a corresponding operation. Specifically, the method includes: The data storage device receives a second request of the data request device, where the second request includes an access address and an operator private key signature. The data storage device sends an access verification request to the blockchain platform, where the access verification request indicates the data request device to send the second request to the data storage device. The data storage device receives second permission information sent by the blockchain platform, where the second permission information indicates whether the data storage device is capable of executing a task corresponding to the second request. If the second permission information indicates that the data storage device is capable of executing the task corresponding to the second request, the data storage device executes the corresponding task based on the second request.

In this possible implementation, before accessing the data storage device, the data request device needs to obtain confirmation of the blockchain platform that the data request device has corresponding permission. Because the blockchain platform has features such as decentralization and untamperability, the blockchain platform with authentication and authorization functions has no risk of a single-point failure, and few data is lost when the blockchain platform suffers from an attack of a network. Therefore, user data has higher security. In addition, the first request includes an access type, and access information is further refined, so that the blockchain platform can more accurately determine permission corresponding to the first request. In addition, because only related information of the user data is stored in the blockchain platform, and all user data is stored in the data storage device, "blockchain expansion problem", "privacy problem", and a "right to forget" problem caused by untamperability of data are avoided.

In a possible implementation of the second aspect, the access type is user data storage, and that the data storage device executes the corresponding task based on the second request includes: The data storage device encrypts the user data based on a symmetric encryption key, and the data storage device stores encrypted user data at an access address.

In a possible implementation of the second aspect, after the data storage device executes the corresponding task based on the second request, the method further includes: The data storage device sends response information to the blockchain platform, where the response information indicates that the data storage device has executed the task corresponding to the second request.

In a possible implementation of the second aspect, after the data storage device executes the corresponding task based on the second request, the method further includes: The data storage device sends acknowledgment information to the data request device, where the acknowledgment information indicates that the data storage device has executed the task corresponding to the second request.

In a possible implementation of the second aspect, the acknowledgment information includes the encrypted user data.

A third aspect of an embodiment of this application provides a user data management method. The method is applied to a user data management system to manage user data. The system includes a data request device, a data storage device, and a blockchain platform. When the data request device needs to access the data storage device, the user data management system performs a corresponding operation. Specifically, the method includes: The blockchain platform receives a first request sent by the data request device, where the first request indicates that the data request device needs to access the data storage device, and the first request includes signature information of the data request device, an access type, and an operator private key signature. The blockchain platform determines, based on the signature information of the data request device, the access type, and the operator private key signature, whether the data request device is capable of accessing the data storage device. The blockchain platform sends first permission information to the data request device, where the first permission information indicates whether the data request device has permission to access the data storage device. The blockchain platform receives an access verification request sent by the data storage device, where the access verification request indicates the data request device to send a second request to the data storage device. If the blockchain platform determines that the data request device is capable of accessing the data storage device, the blockchain platform sends second permission information to the data storage device, where the second permission information indicates that the data storage device is capable of executing a task corresponding to the second request.

Before accessing the data storage device, the data request device needs to obtain confirmation of the blockchain platform that the data request device has the corresponding permission. Because the blockchain platform has features such as decentralization and untamperability, the blockchain platform with authentication and authorization functions has no risk of a single-point failure, and few data is lost when the blockchain platform suffers from an attack of a network. Therefore, user data has higher security. In addition, the first request includes the access type, and access information is further refined, so that the blockchain platform can more accurately determine permission corresponding to the first request.

In a possible implementation of the third aspect, after the blockchain platform sends the second permission information to the data storage device, the method further includes: The blockchain platform receives, response information sent by the data storage device, where the response information indicates that the data storage device has executed the task corresponding to the second request. The blockchain platform records, into a distributed ledger based on the response message, that the data storage device has executed the task corresponding to the second request.

In a possible implementation of the third aspect, if the access type is data reading, the first permission information includes an access address.

A fourth aspect of an embodiment of this application provides a user data management method. The method is applied to a user data management system to manage user data. The system includes a data request device, a data storage device, and a blockchain platform. When the data request device needs to access the data storage device, the user data management system performs a corresponding operation. Specifically, the method includes: The blockchain platform receives a first key update request sent by the data request device, where the first key update request indicates that the data request device needs the data storage device to update first user data related to a first key of a user to second user data related to a second key of the user, and the key update request includes signature information of the data request device, an access type, a second public key of the user encrypted based on an operator private key, and a user root private key signature. The blockchain platform determines, based on a user root public key and a first public key of the user, whether the data request device has permission for the data storage device to update the first user data to the second user data. If the blockchain platform determines that the data request device has the permission, the blockchain platform sends a second key update request to the data storage device, where the second key update request indicates the data storage device to send the first user data to the blockchain platform. The blockchain platform receives a first response message sent by the data storage device, where the first response message includes the first user data. The blockchain platform updates the first user data encrypted based on a first symmetric encryption key to the second user data encrypted based on a second symmetric encryption key, where the first symmetric encryption key is related to the first key of the user, and the second symmetric encryption key is related to the second key of the user. The blockchain platform sends a third request to the data storage device, where the third request includes the second user data, and the third request indicates the data storage device to store the second user data.

In a possible implementation of the fourth aspect, after the blockchain platform sends the third request to the data storage device, the method further includes: The blockchain platform receives a second response message sent by the data storage device, where the second response message indicates that the data storage device has stored the second user data. The blockchain platform records, into a distributed ledger, that the data storage device has stored the second user data.

In a possible implementation of the fourth aspect, the method further includes: The blockchain platform sends an acknowledgment message to the data request device, where the acknowledgment message indicates that the blockchain platform has updated the first user data to the second user data.

A fifth aspect of an embodiment of this application provides a user data management method. The method is applied to a user data management system to manage user data. The system includes a data request device, a data storage device, and a blockchain platform. When the data request device needs to access the data storage device, the user data management system performs a corresponding operation. Specifically, the method includes: The data request device sends a first key update request to the blockchain platform, where the first key update request indicates that the data request device needs the data storage device to update first user data encrypted based on a first key of a user to second user data encrypted based on a second key of the user, and the first key update request includes signature information of the data request device, an access type, a new public key of the user encrypted based on an operator private key, and a user root private key signature. The data request device receives an acknowledgment message sent by the blockchain platform, where the acknowledgment message indicates that the data storage device has updated the first user data to the second user data.

A sixth aspect of this application provides a data request device. The data request device has a function of implementing the method in any one of the first aspect or the possible implementations of the first aspect. The function may be implemented by hardware, or may be implemented by hardware executing corresponding software. The hardware or software includes one or more modules corresponding to the foregoing function, for example, a first sending module.

A seventh aspect of this application provides a data storage device. The data storage device has a function of implementing the method in any one of the second aspect or the possible implementations of the second aspect. The function may be implemented by hardware, or may be implemented by hardware executing corresponding software. The hardware or software includes one or more modules corresponding to the foregoing function, for example, a first receiving module.

An eighth aspect of this application provides a blockchain platform device. The blockchain platform device has a function of implementing the method in any one of the third aspect or the possible implementations of the third aspect. The function may be implemented by hardware, or may be implemented by hardware executing corresponding software. The hardware or software includes one or more modules corresponding to the foregoing function, for example, a first receiving module.

A ninth aspect of this application provides a blockchain platform device. The blockchain platform device has a function of implementing the method in any one of the fourth aspect or the possible implementations of the fourth aspect. The function may be implemented by hardware, or may be implemented by hardware executing corresponding software. The hardware or software includes one or more modules corresponding to the foregoing function, for example, a first receiving module.

A tenth aspect of this application provides a data request device. The data request device has a function of implementing the method in any one of the fifth aspect or the possible implementations of the fifth aspect. The function may be implemented by hardware, or may be implemented by hardware executing corresponding software. The hardware or software includes one or more modules corresponding to the foregoing function, for example, a first sending module.

An eleventh aspect of this application provides a data request device. The data request device includes at least one processor, a memory, an input/output (input/output, I/O) interface, and computer executable instructions that are stored in the memory and that can be run on the processor. When the computer executable instructions are executed by the processor, the processor performs the method according to any one of the first aspect or the possible implementations of the first aspect.

A twelfth aspect of this application provides a data storage device. The data storage device includes at least one processor, a memory, an input/output (input/output, I/O) interface, and computer executable instructions that are stored in the memory and that can be run on the processor. When the computer executable instructions are executed by the processor, the processor performs the method according to any one of the second aspect or the possible implementations of the second aspect.

A thirteenth aspect of this application provides a blockchain platform device. The blockchain platform device includes at least one processor, a memory, an input/output (input/output, I/O) interface, and computer executable instructions that are stored in the memory and that can be run on the processor. When the computer executable instructions are executed by the processor, the processor performs the method according to any one of the third aspect or the possible implementations of the third aspect.

A fourteenth aspect of this application provides a blockchain platform device. The blockchain platform device includes at least one processor, a memory, an input/output (input/output, I/O) interface, and computer executable instructions that are stored in the memory and that can be run on the processor. When the computer executable instructions are executed by the processor, the processor performs the method according to any one of the fourth aspect or the possible implementations of the fourth aspect.

A fifteenth aspect of this application provides a data request device. The data request device includes at least one processor, a memory, an input/output (input/output, I/O) interface, and computer executable instructions that are stored in the memory and that can be run on the processor. When the computer executable instructions are executed by the processor, the processor performs the method according to any one of the fifth aspect or the possible implementations of the fifth aspect.

A sixteenth aspect of this application provides a computer-readable storage medium storing one or more computer-executable instructions. When the computer-executable instructions are executed by a processor, the processor performs the method according to any one of the first aspect or the possible implementations of the first aspect.

A seventeenth aspect of this application provides a computer-readable storage medium storing one or more computer-executable instructions. When the computer-executable instructions are executed by a processor, the processor performs the method according to any one of the second aspect or the possible implementations of the second aspect.

An eighteenth aspect of this application provides a computer-readable storage medium storing one or more computer-executable instructions. When the computer-executable instructions are executed by a processor, the processor performs the method according to any one of the third aspect or the possible implementations of the third aspect.

A nineteenth aspect of this application provides a computer-readable storage medium storing one or more computer-executable instructions. When the computer-executable instructions are executed by a processor, the processor performs the method according to any one of the fourth aspect or the possible implementations of the fourth aspect.

A twentieth aspect of this application provides a computer-readable storage medium storing one or more computer-executable instructions. When the computer-executable instructions are executed by a processor, the processor performs the method according to any one of the fifth aspect or the possible implementations of the fifth aspect.

A twenty-first aspect of this application provides a computer program product storing one or more computer-executable instructions. When the computer-executable instructions are executed by a processor, the processor performs the method according to any one of the first aspect or the possible implementations of the first aspect.

A twenty-second aspect of this application provides a computer program product storing one or more computer-executable instructions. When the computer-executable instructions are executed by a processor, the processor performs the method according to any one of the second aspect or the possible implementations of the second aspect.

A twenty-third aspect of this application provides a computer program product storing one or more computer-executable instructions. When the computer-executable instructions are executed by a processor, the processor performs the method according to any one of the third aspect or the possible implementations of the third aspect.

A twenty-fourth aspect of this application provides a computer program product storing one or more computer-executable instructions. When the computer-executable instructions are executed by a processor, the processor performs the method according to any one of the fourth aspect or the possible implementations of the fourth aspect.

A twenty-fifth aspect of this application provides a computer program product storing one or more computer-executable instructions. When the computer-executable instructions are executed by a processor, the processor performs the method according to any one of the fifth aspect or the possible implementations of the fifth aspect.

A twenty-sixth aspect of this application provides a chip system. The chip system includes at least one processor, and the at least one processor is configured to implement the function in any one of the first aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

A twenty-seventh aspect of this application provides a chip system. The chip system includes at least one processor, and the at least one processor is configured to implement the function in any one of the second aspect or the possible implementations of the second aspect. In a possible design, the chip system may further include a memory. The memory is configured to store program instructions and data that are necessary for an artificial intelligence model-based data processing apparatus. The chip system may include a chip, or may include a chip and another discrete component.

A twenty-eighth aspect of this application provides a chip system. The chip system includes at least one processor, and the at least one processor is configured to implement the function in any one of the third aspect or the possible implementations of the third aspect. In a possible design, the chip system may further include a memory. The memory is configured to store program instructions and data that are necessary for an artificial intelligence model-based data processing apparatus. The chip system may include a chip, or may include a chip and another discrete component.

A twenty-ninth aspect of this application provides a chip system. The chip system includes at least one processor, and the at least one processor is configured to implement the function in any one of the third aspect or the possible implementations of the third aspect. In a possible design, the chip system may further include a memory. The memory is configured to store program instructions and data that are necessary for an artificial intelligence model-based data processing apparatus. The chip system may include a chip, or may include a chip and another discrete component.

A thirtieth aspect of this application provides a chip system. The chip system includes at least one processor, and the at least one processor is configured to implement the function in any one of the first aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

It can be learned from the foregoing technical solutions that, embodiments of this application have the following advantages: Before accessing a data storage device, a data request device needs to obtain confirmation of a blockchain platform that the data request device has corresponding permission. Because the blockchain platform has features such as decentralization and untamperability, the blockchain platform with authentication and authorization functions has no risk of a single-point failure, and few data is lost when the blockchain platform suffers from a distributed denial of service attack. Therefore, user data has higher security. In addition, information transmitted between the data request device, the data storage device, and the blockchain platform is signed by a key of an operator, so as to ensure information security.

DESCRIPTION OF EMBODIMENTS

Embodiments of this application provide a user data management method and a related device, to improve user data security.

The following describes embodiments of this application with reference to accompanying drawings. It is clear that the described embodiments are merely some but not all of embodiments of this application. A person of ordinary skill in the art may learn that, with development of technologies and emergence of new scenarios, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

User data management is one of core functions of a mobile communication network. Provision of subscriber services and normal operation of the network depend on a user data management entity and related processes. A user data management entity of a mobile network stores user and service registration related data, key information, and the like. The user and service subscription related data, the key information, and the like are the key to user authentication, authorization, and access control.

Figure 1:
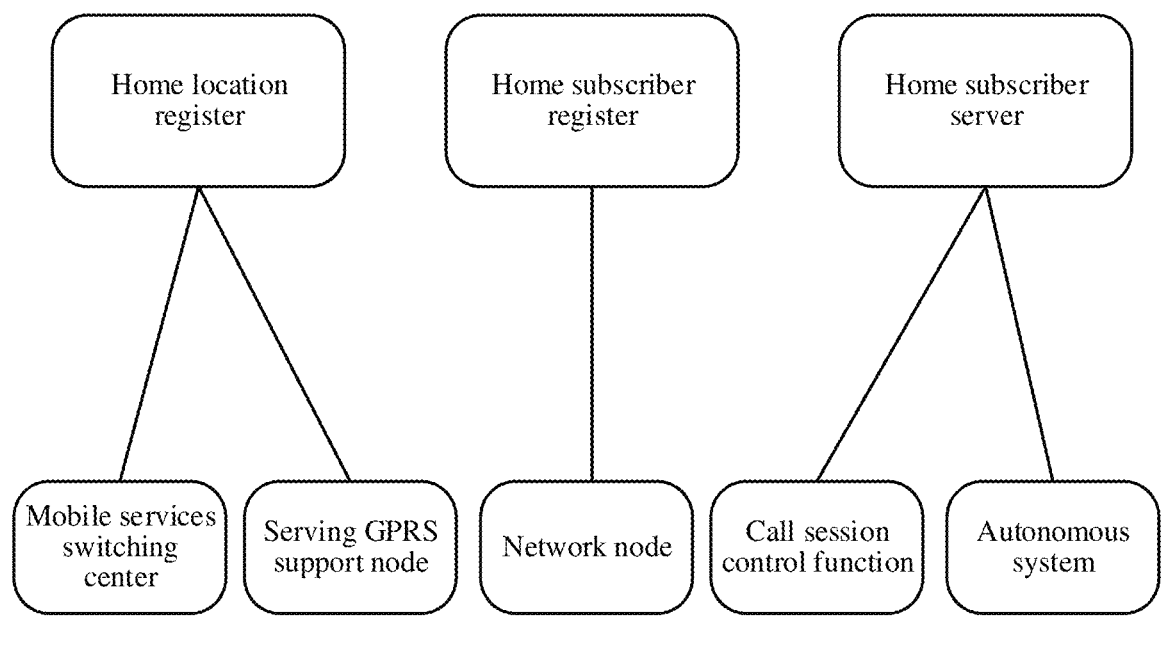
FIG. 1 is a schematic diagram of a network architecture of a user data architecture of a 2 G/3G/4G/IMS network.
Figure 2:
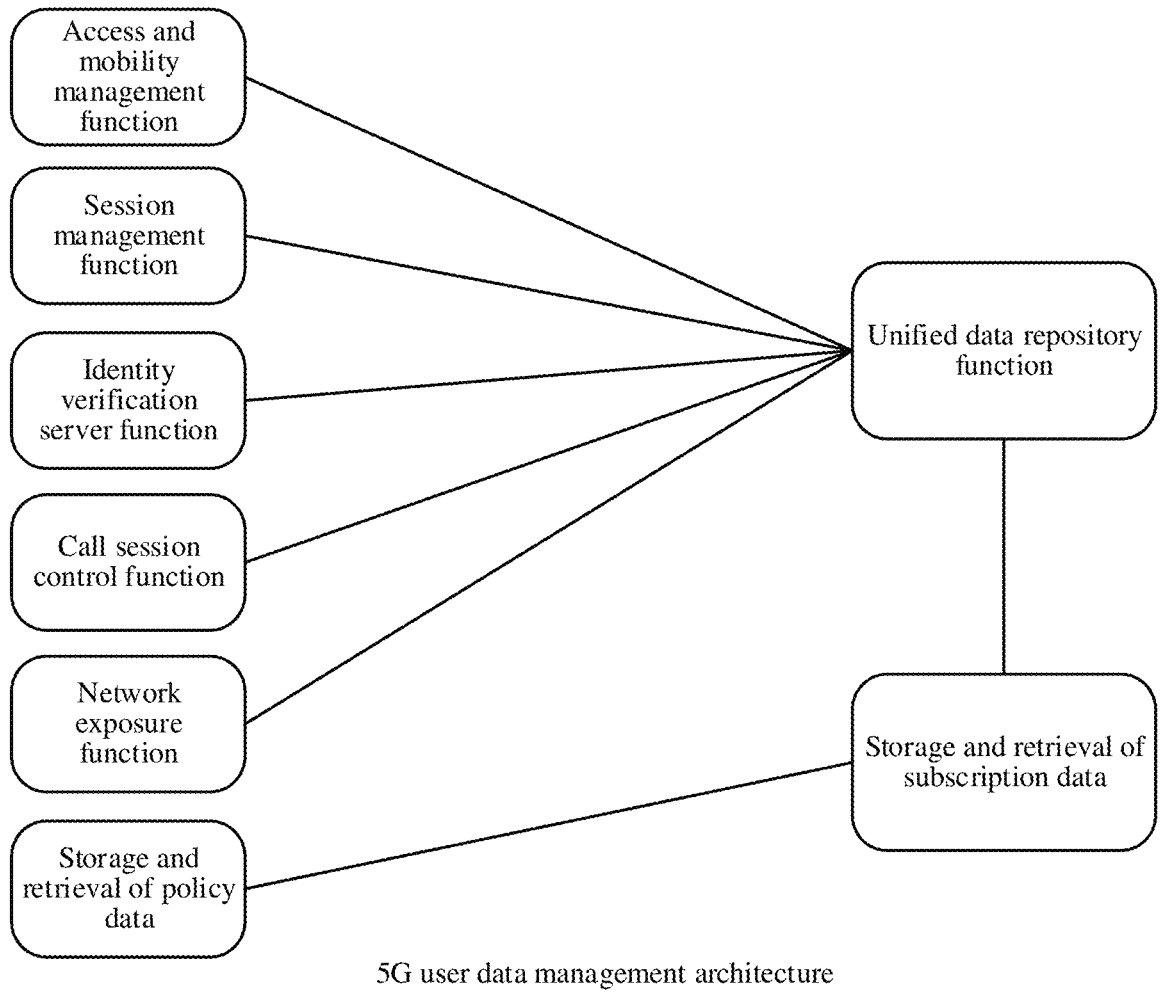
FIG. 2 is a schematic diagram of a network architecture of a user data architecture of a 5G network.

In current 2G to 5G core network architectures, each user has a lot of information, such as subscription information, key information, and service information. The user information is processed together in a centralized single-point user data management device. The user data management device is connected to another control panel network entity or application server, to provide services such as data access and access. As shown in FIG. 1, for example, in 2G, 3G, 4G, and Internet Protocol multimedia subsystem (IP Multimedia Subsystem, IMS) architectures, user data management entities are home location registers (Home Location Registers, HLRs) and home subscriber servers (Home Subscriber Servers, HSSs). These entities interface with another control plane network function entity or application server to provide access and access services. As shown in FIG. 2, for example, in a core network architecture of a 5G network, user information is managed by unified data management (Unified Data Management, UDM). The UDM manages network user data in a single element and may be paired with a user data repository. The user data repository stores the user information. The UDM is located on a control plane.

Based on the foregoing mobile communication network, the following describes a user data management method in an embodiment of this application.

Figure 3:
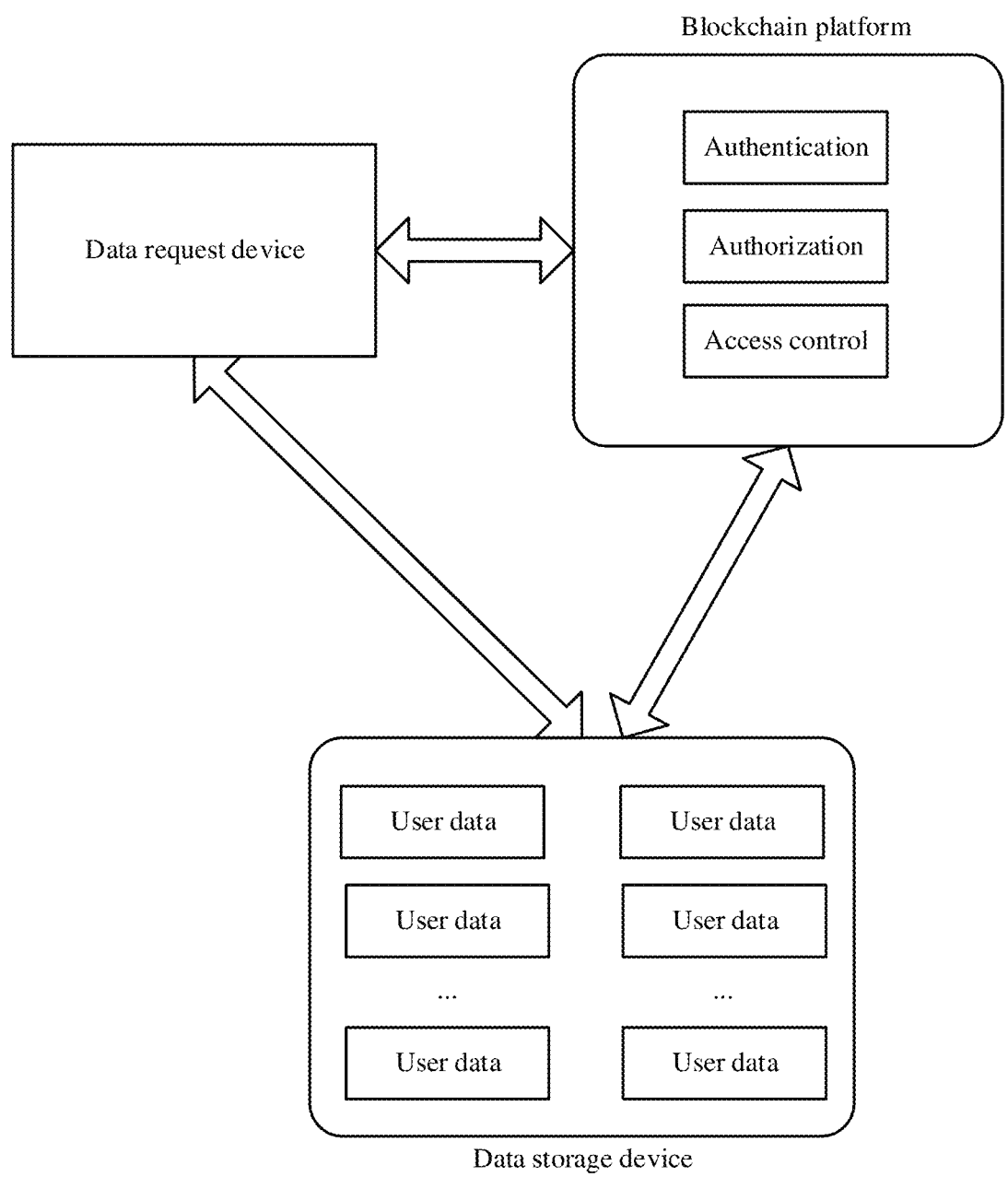
FIG. 3 is a schematic diagram of a scenario of a user data management method according to an embodiment of this application.

As shown in FIG. 3, an embodiment of this application provides a user data management method. The method is applied to a user data management system. The user data management system in this application includes a data request device, a blockchain platform, and a data storage device. The data request device is a device that needs to perform a corresponding operation on user data, and may be a device like a data subject (Data Subject, DS), a data controller (Data Controller, DC), and a data processor (Data Processor, DP), or may be user equipment, an access network device, and a core network element. The user equipment may be a terminal device like a notebook computer, a tablet computer, a computer, an LTE assistant terminal, an NR assistant terminal, an assistant, a semi-active tag, an active tag, a wireless relay station, an LTE mobile phone, and an NR mobile phone. The access network device may be an access network device like a macro base station, a pole base station, a long term evolution (long term evolution, LTE) base station, an evolved NodeB (evolved NodeB, eNB), a wireless relay (Relay) station, a Femto base station, a Pico base station, and a next generation NodeB (next generation NodeB, gNB). The core network element may be a core network element like an identity verification server and a session management server.

The blockchain platform is configured to store a data operation, a policy management transaction, and a data pointer. The data pointer points to user data stored in the data storage device. Specifically, on one hand, the blockchain platform implements decentralization, and implements access authentication, authorization, and access control logic. On the other hand, all data operation and policy management records are recorded in an untamperable distributed ledger. The access records include a storage address and an access policy of personal user data. In this embodiment of this application, a centralized trust mode is eliminated based on features such as decentralization, untamperability, traceability, and transparency of the blockchain platform. To be specific, the blockchain platform acts as an authentication and authorization server, and the blockchain platform performs authentication and authorization on all operations of the data request device. In addition, a smart contract deployed on a blockchain is responsible for automatic access control management, and the blockchain is responsible for an untamperable log system that is used to record any access operation on data in the chain.

The data storage device is configured to store personal data of a user, and the personal data of the user is not stored on the blockchain platform, so as to resolve a "blockchain expansion problem", a "privacy problem", and a "right to forget data" problem caused by data untamperability of the blockchain platform.

In addition, the user data management system in this embodiment of this application may be classified into a user-side device and a network service provider-side device, namely, an operator-side device. The user-side device is configured with a user root key pair, a user public-private key pair, and an operator public key. The user root key pair includes a user root public key and a user root private key, and the user public-private key pair includes a user public key and a user private key. The operator-side device is configured with an operator public-private key pair and a user public key, and the operator public-private key pair includes an operator public key and an operator private key. The user-side device includes user equipment in the user request device, and the operator-side device includes a core network device, an access network device, a blockchain platform, and a data storage device in a data request device.

In this embodiment of this application, when a device of the operator-side device transfers information, a device that sends the information signs, based on the operator private key, the information that needs to be transferred or stored. After receiving the message, a device that receives the message may verify the signature based on the operator public key. Correspondingly, when the user-side device transfers information to the device of the operator-side device, the user-side device signs, based on the user private key, the information that needs to be transferred or stored, and the operator-side device that receives the message may verify the signature based on the user public key. Correspondingly, when the device of the operator-side device transfers information to the user-side device, the device of the operator-side device signs, based on the operator private key, the information that needs to be transferred or stored, and the user-side device that receives the message may verify the signature based on the operator public key. In this embodiment of this application, the device of the operator-side device and the user-side device may perform data signature authentication according to the foregoing method each time data is transferred, or may not perform data signature authentication, but only transfer information that needs to be transferred or stored. This is not specifically limited herein.

Figure 4:
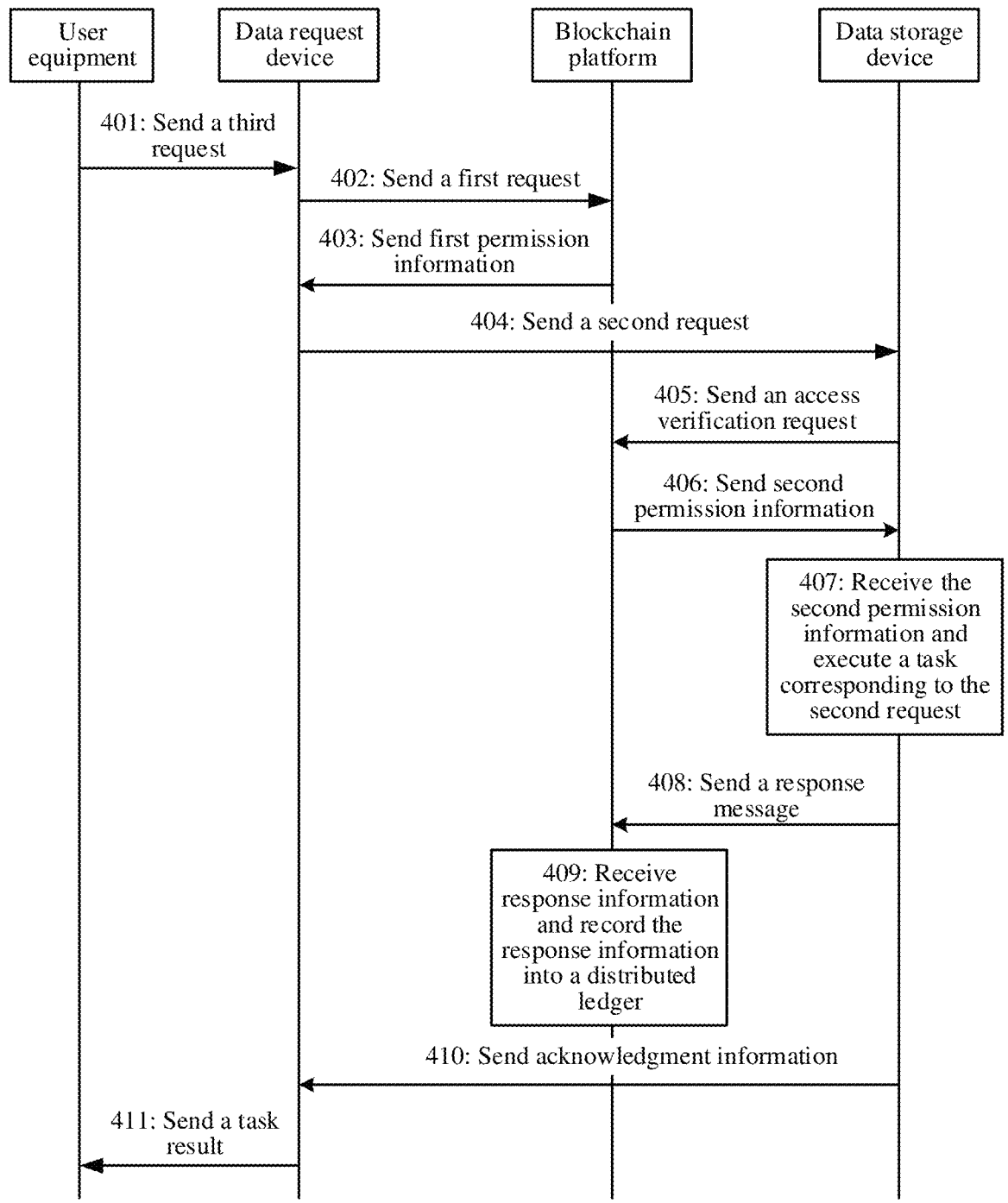
FIG. 4 is a schematic flowchart of a user data management method according to an embodiment of this application.

As shown in FIG. 4, a procedure of a user data management method in an embodiment of this application includes the following steps.

401: User equipment sends a third request to a data request device.

When the user equipment needs a data storage device to execute a corresponding task, the user equipment sends the third request to the data request device. The third request indicates the data request device to send a first request to a blockchain platform, and the third request includes signature information of the user equipment and a user public key. The third request in this embodiment of this application may further include user equipment information, a data pointer (namely, a data address of data that the user equipment wants to access in the data storage device), a data access type (namely, a data access policy), a user root public key, and a user public key. The user root public key is a unique and unchangeable key of a user.

Specifically, in a possible implementation, when the user needs to deregister, the following step may be performed: The user equipment sends a registration request to the data request device like a CRM device and a BOSS, where the registration request is the third request.

In a possible implementation, the user equipment further calculates a first symmetric encryption key. The first symmetric encryption key is related to a user private key and an operator public key. For example, the first symmetric encryption key Ken may be Ken=the user private key*the operator public key. This is not specifically limited herein.

402: The data request device sends the first request to the blockchain platform.

The data request device sends the first request to the blockchain platform. The first request indicates that the data request device needs to access the data storage device. The first request includes signature information of the data request device, an access type, and an operator private key signature. The signature information of the data request device is used by the blockchain platform to determine permission corresponding to the first request.

In this embodiment of this application, the access type may be data writing, data deletion, or data reading. In addition, the access type in this embodiment of this application may also be another type, for example, data modification. This is not specifically limited herein.

In this embodiment of this application, the first request includes the signature information of the data request device, the operator private key signature, and the access type. In addition, in this embodiment of this application, the first request may include user equipment information, or related information of a task that the user equipment needs the data storage device to execute, and may further include the data pointer (namely, the data address of the data that the user equipment wants to access in the data storage device), the data access type (namely, the data access policy), the user root public key, and the user public key. For example, when the access type is data writing, the first request further includes an access address, and the access address may be a data pointer. For example, if the access type is data writing, the first request further includes the access address and the user public key. This is not specifically limited herein.

In this embodiment of this application, the signature information of the data request device may include the signature information of the data request device, or may include the signature information of the user equipment, or may include electronic signature information of the data request device and the signature information of the user equipment, or may be other information that may indicate the data request device or the user equipment. This is not specifically limited herein. In this embodiment of this application, the signature information may be an electronic signature, or may be identification information such as an ID. This is not specifically limited herein.

In this embodiment of this application, the data request device is a device other than the user equipment, for example, a core network element, an access network device, and a network function entity. In addition, the data request device may alternatively be user equipment like a terminal. If the data request device is the user equipment, step 401 is not performed, and the user equipment serving as the data request device directly sends the first request to the blockchain platform. This is not specifically limited herein.

In this embodiment of this application, the data access is initiated by the user equipment, or may be initiated by the core network element, the access network device, or the network function entity. If the data access is initiated by the core network element, the access network device, or the network function entity, step 401 is not performed. This is not specifically limited herein.

Specifically, in a possible implementation, when the user equipment needs to register a service, a CRM device and a BOSS that are used as the data request device send the first request to the blockchain platform, that is, initiate a registration transaction. The first request includes an identifier of the user equipment, information about the user equipment, the data pointer, the data access policy, a root public key of the user equipment, and the user public key. The first request is that the registration transaction is signed by an operator private key.

Figure 5:
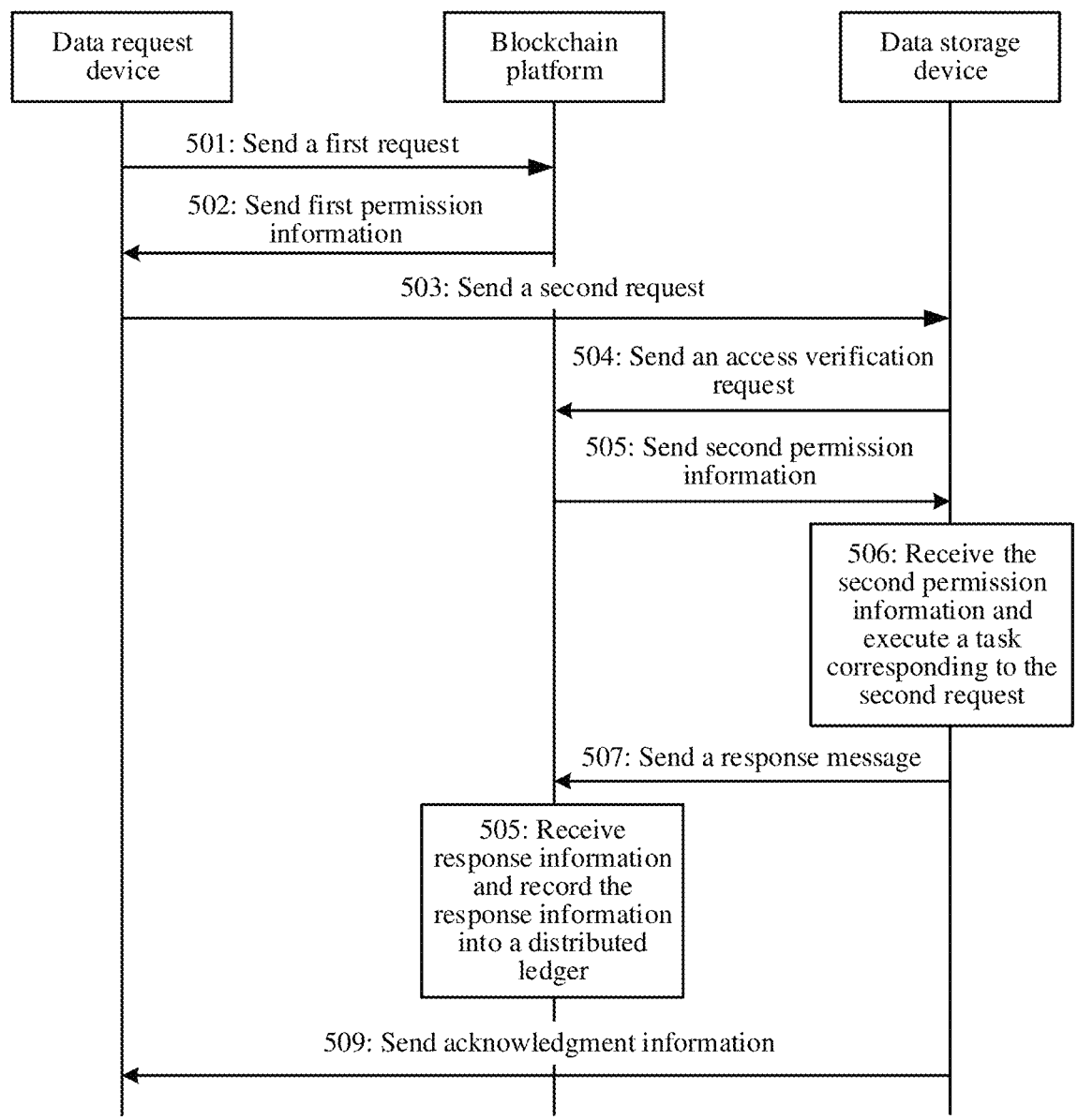
FIG. 5 is another schematic flowchart of a user data management method according to an embodiment of this application.

Specifically, in a possible implementation, as shown in FIG. 5, when a network function device needs to access user data, the network function device serving as the data request device sends the first request to the blockchain platform. The first request indicates that the network function device needs to access the user data in the data storage device. The first request includes related information of the user, and the first request is signed by the operator private key.

403: The blockchain platform sends first permission information to the data request device.

The blockchain platform determines whether the data request device can access the data storage device, and then the blockchain platform sends the first permission information to the data request device, where the first permission information indicates whether the data request device can access the data storage device.

In a possible implementation, when the access type is data reading, the first permission information further includes the access address, where the access address may be a data pointer; and if the access type is data reading, the first permission information includes the access address and the user public key.

Specifically, after receiving the first request sent by the data request device, the blockchain platform determines permission of the first request based on the signature information of the data request device, the operator private key signature, and the access type that are included in the first request. The blockchain platform may check, based on a pre-configured operator public key, whether the first request is signed by the operator private key. Because the digital signature information has unique authenticity and reliability, that is, a digital signature can uniquely determine the data request device, the digital signature is used by the blockchain platform to determine whether the request is initiated by the user equipment, that is, determine authenticity of the first request, and determine whether the first request is known by the user equipment and confirmed by the user equipment, so as to determine the permission corresponding to the first request, that is, determine whether the data request device that sends the first request has the permission to access the data storage device and enable the data storage device to perform a corresponding task. After the blockchain determines that the data request device can access the data storage device, that is, the first request has corresponding permission, the blockchain platform sends the first permission information to the data request device, where the first permission information indicates that the data request device can access the data storage device, that is, the first request has permission corresponding to the task corresponding to the first request.

Specifically, in a possible implementation, when the network function device needs to access the user data, after the blockchain platform receives the first request, the blockchain platform queries latest transaction information of the user equipment in a distributed ledger, and obtains the user public key from the transaction information. Then, the blockchain platform determines the permission of the first request based on the signature information of the data request device, the operator private key signature, and the access type that are included in the first request, and sends a first request message to the data request device. If the first permission information indicates that the data request device has the permission to access the data storage device, the first permission information includes the access address of the data and the user public key.

404: The data request device sends a second request to the data storage device.

After the data request device receives the first permission information, if the first permission information indicates that the data request device has the permission to access the data storage device, the data request device learns that the blockchain platform has determined that the data request device can access the data storage device, and then the data request device sends the second request to the data storage device, where the second request indicates the data storage device to execute a task corresponding to the second request. The second request may include the identifier of the user equipment, the information about the user equipment, information about the user, the data pointer, the data access type, the user public key, and the operator private key signature.

In a possible implementation, if the first permission information further includes the user public key, the data storage device confirms a symmetric encryption key based on the user public key, where the symmetric encryption key is related to the user public key and the operator private key.

The data storage device sends an access verification request to the blockchain platform.

After the data storage device receives the second request sent by the data request device, because the second request indicates the data storage device to execute the corresponding task, the data storage device needs to determine whether the second request has permission corresponding to the task. The data storage device sends the access verification request to the blockchain platform, where the access verification request indicates that the data request device sends the second request to the data storage device, and the access verification request includes related information of the second request, so that the blockchain platform determines permission information of the second request based on the related information of the second request.

406: The blockchain platform sends second permission information to the data storage device.

After the blockchain platform receives the access verification request sent by the data storage device, the blockchain platform determines, based on the related information of the second request in the access verification request, whether the second request has the corresponding permission, that is, whether the data storage device can access the data storage device. Then, the blockchain platform sends the second permission information to the data storage device, where the second permission information may indicate whether the data storage device can execute the task corresponding to the second request.

407: The data storage device receives the second permission information and executes the task corresponding to the second request.

The data storage device receives the second permission information sent by the blockchain platform, where the second permission information indicates whether the data storage device can execute the task corresponding to the second request, that is, whether the permission of the user equipment corresponding to signature information included in the second request can enable the data storage device to execute the task corresponding to the second request. The data storage device may check whether the second request is signed by the operator private key based on the pre-configured operator public key. If the second permission information indicates that the data storage device can execute the task corresponding to the second request, the data storage device can execute the task corresponding to the second request after receiving the second permission information.

Specifically, in a possible implementation, when the user equipment needs to register the service, after the data storage device receives the second permission information, if the second permission information indicates that the data storage device can execute the task corresponding to the second request, and the operator private key signature in the second request passes the check performed by the data storage device based on the operator public key, the data storage device encrypts the user data based on a symmetric encryption key and stores encrypted user data at an address corresponding to the data pointer, where the symmetric encryption key is related to the user public key and the operator private key. For example, the symmetric encryption key may be a product of the user public key and the operator private key.

408: The data storage device sends response information to the blockchain platform.

After executing the task corresponding to the second request, the data storage device sends the response information to the blockchain platform. The response information indicates that the data storage device has completed the task corresponding to the second request. The response information includes related information of the task, for example, result information of the task, identification information of the user who initiates the task, an execution policy of the task, and related information of the data storage device that executes the task.

409: The blockchain platform receives the response information and records the response information into the distributed ledger.

The blockchain platform receives the response information sent by the data storage device, where the response information indicates that the data storage device has completed the task corresponding to the second request, and correspondingly, the response information includes the related information of the task, for example, the result information of the task, the identification information of the user who initiates the task, the execution policy of the task, and the related information of the data storage device that executes the task. Then, the blockchain platform may broadcast the related information of the task to each node of the blockchain platform. After all nodes reach a consensus, the blockchain platform records the related information of the task in the untamperable distributed ledger of the blockchain platform. Each node of the blockchain platform records complete related information of the task, and storage of each node is independent and has a same status.

410: The data storage device sends acknowledgment information to the data request device.

The data storage device sends an acknowledgment message to the data request device, where the acknowledgment message indicates that the data storage device has completed the task corresponding to the second request.

Specifically, in a possible implementation, if the access type is data reading, the acknowledgment message includes the encrypted user data. After receiving the encrypted user data, the data request device may decrypt the encrypted user data based on the symmetric encryption key, to obtain the user data.

In this embodiment of this application, the data storage device may first perform step 408 and then perform step 410, or may first perform step 410 and then perform step 408, or may perform two steps at the same time. This is not specifically limited herein.

411: The data storage device sends task result information to the user equipment.

The data storage device sends the task result information to the user equipment, where the task result information indicates whether the data request device has completed the task corresponding to the third request.

In this embodiment of this application, when a device of an operator-side device transfers information, a device that sends the information signs, based on the operator private key, the information that needs to be transferred or stored.

After receiving the message, a device that receives the message may verify the signature based on the operator public key. Correspondingly, when a user-side device transfers information to the device of the operator-side device, the user-side device signs, based on the user private key, the information that needs to be transferred or stored, and the operator-side device that receives the message may verify the signature based on the user public key. Correspondingly, when the device of the operator-side device transfers information to the user-side device, the device of the operator-side device signs, based on the operator private key, the information that needs to be transferred or stored, and the user-side device that receives the message may verify the signature based on the operator public key.

In this embodiment of this application, the device of the operator-side device and the user-side device may perform data signature authentication according to the foregoing method each time data is transferred, or may not perform data signature authentication, but only transfer information that needs to be transferred or stored. This is not specifically limited herein. In this embodiment of this application, the device of the operator-side device includes a data request device (when the device is not user equipment), a blockchain platform, and a data storage device, and the user-side device includes user equipment.

In this embodiment of this application, the data request device initiates an access request for user data. In addition, the data request device may initiate a request for updating a user key. Details are described below.

Figure 6:
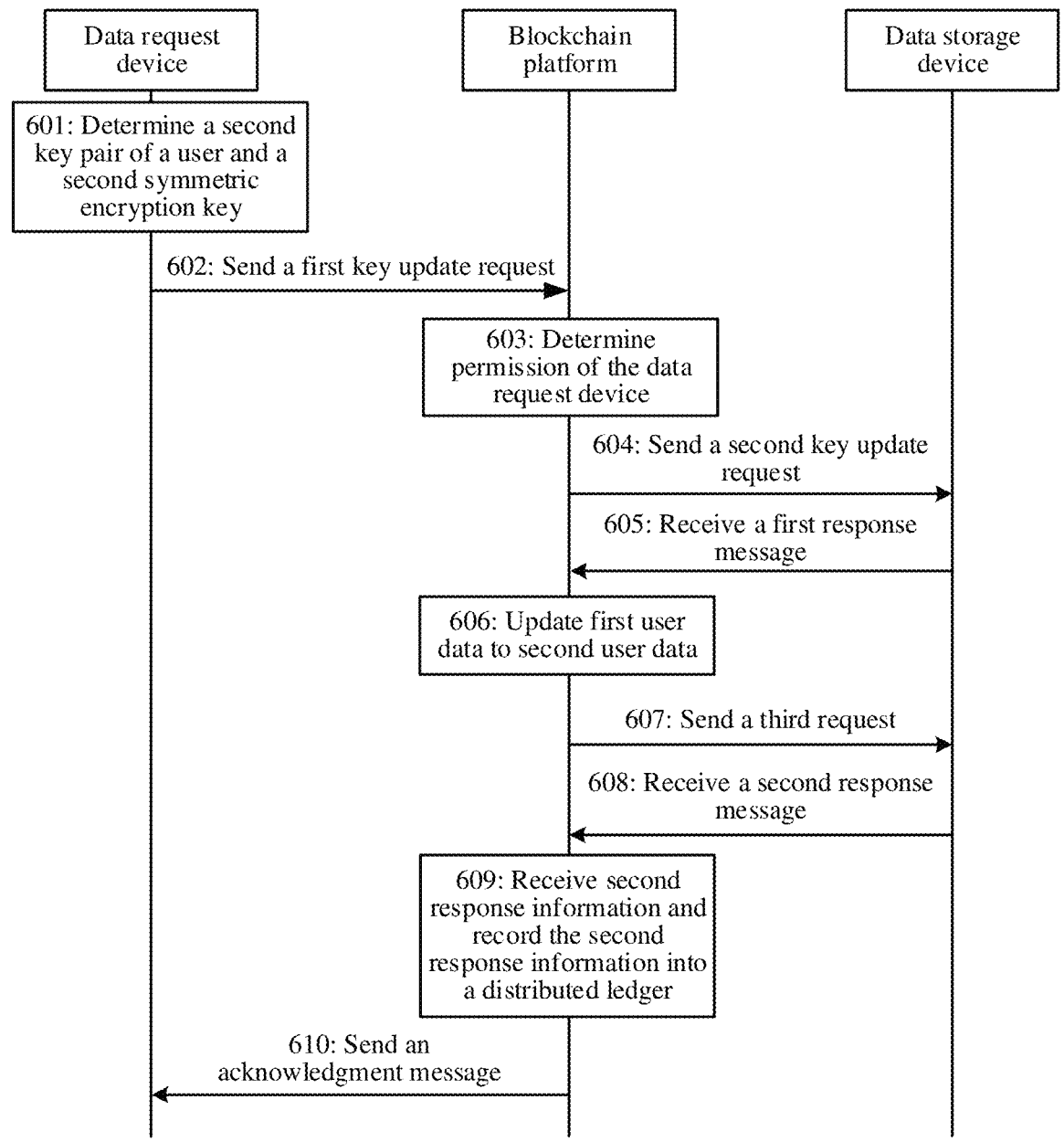
FIG. 6 is another schematic flowchart of a user data management method according to an embodiment of this application.

As shown in FIG. 6, another procedure of a user data management method in an embodiment of this application includes the following steps.

601. A data request device determines a second key pair of a user and a second symmetric encryption key.

The data request device generates the second key pair of the user, where the second key pair of the user includes a second public key of the user and a second private key of the user, and the second key pair of the user is a new key pair used to replace a first key pair of the user, namely, an old key pair. Then, the data request device determines the second symmetric encryption key based on the second private key of the user and an operator public key, where the second symmetric encryption key is used to replace a first symmetric encryption key, and the first symmetric encryption key is related to a first private key of the user and the operator public key.

602: The data request device sends a first key update request to a blockchain platform.

The data request device sends the key update request to the blockchain platform. The key update request indicates that the data request device needs a data storage device to update first user data related to a first key of the user to second user data related to a second key of the user. The key update request includes signature information of the data request device, an access type, a second public key of the user encrypted based on an operator private key, and a user root private key signature, and the key update request is signed by a user root private key.

603: The blockchain platform determines permission of the data request device.

After the blockchain platform receives the first key update request sent by the data request device, the blockchain device determines whether the request device has the corresponding permission.

Specifically, the blockchain platform queries latest transaction information of the user, and obtains a user root public key and a previous public key of the user, namely, a first public key of the user, based on the transaction information. Then, the blockchain platform checks, based on the user root public key, whether the key update request is signed by the user root private key. The blockchain platform determines permission of the first key update request based on the signature information of the data request device, an operator private key signature, and the access type that are included in the first key update request. Because the digital signature information has unique authenticity and reliability, that is, a digital signature can uniquely determine the data request device, the digital signature is used by the blockchain platform to determine whether the request is initiated by the user equipment, that is, determine authenticity of the first key update request, and determine whether the first key update request is known by the user equipment and confirmed by the user equipment, so as to determine the permission corresponding to the first key update request, that is, determine whether the data request device that sends the first request has permission to access the data storage device and enable the data storage device to execute a corresponding task. The blockchain platform further decrypts, based on the operator private key, the second public key of the user encrypted based on the operator private key, to obtain the unencrypted second public key of the user.

604: The blockchain platform sends a second key update request to the data storage device.

If the blockchain platform determines that the data request device has the corresponding permission, the blockchain platform sends the second key update request to the data storage device, where the second key update request indicates the data storage device to send the first user data to the blockchain platform. The second key update request includes a data address corresponding to the first user data.

605: The blockchain platform receives a first response message sent by the user data storage device.

The blockchain platform receives the first response message sent by the data storage device, where the first response message includes the first user data.

606: The blockchain platform updates the first user data to the second user data.

The blockchain platform updates the first user data encrypted based on the first symmetric encryption key to the second user data encrypted based on the second symmetric encryption key. Specifically, the blockchain platform decrypts the first user data based on the first symmetric encryption key, and then encrypts decrypted user data based on the second symmetric encryption key, to generate the second user data. The first symmetric encryption key is related to the first key of the user and the operator public key, and the second symmetric encryption key is related to the second key of the user and the operator public key.

607: The blockchain platform sends a third request to the data storage device.

The blockchain platform sends the third request to the data storage device, where the third request includes the second user data and a corresponding data pointer, and the third request indicates the data storage device to store the second user data at an address corresponding to the pointer.

608: The blockchain platform receives a second response message sent by the data storage device.

The blockchain platform receives the second response message sent by the data storage device, where the second response message indicates that the data storage device has stored the second user data.

609: The blockchain platform receives the second response message and records the second response information into a distributed ledger.

The blockchain platform receives the second response information sent by the data storage device, where the response information indicates that the data storage device has completed a task corresponding to the third request, and correspondingly, the response information includes related information of the task, for example, result information of the task, identification information of the user who initiates the task, an execution policy of the task, and related information of the data storage device that executes the task. Then, the blockchain platform may broadcast the related information of the task to each node of the blockchain platform. After all nodes reach a consensus, the blockchain platform records the related information of the task in the untamperable distributed ledger of the blockchain platform. Each node of the blockchain platform records complete related information of the task, and storage of each node is independent and has a same status.

610: The blockchain platform sends an acknowledgment message to the data request device.

The blockchain platform sends the acknowledgment message to the data request device, where the acknowledgment message indicates that the blockchain platform has updated the first user data to the second user data.

Figure 7:
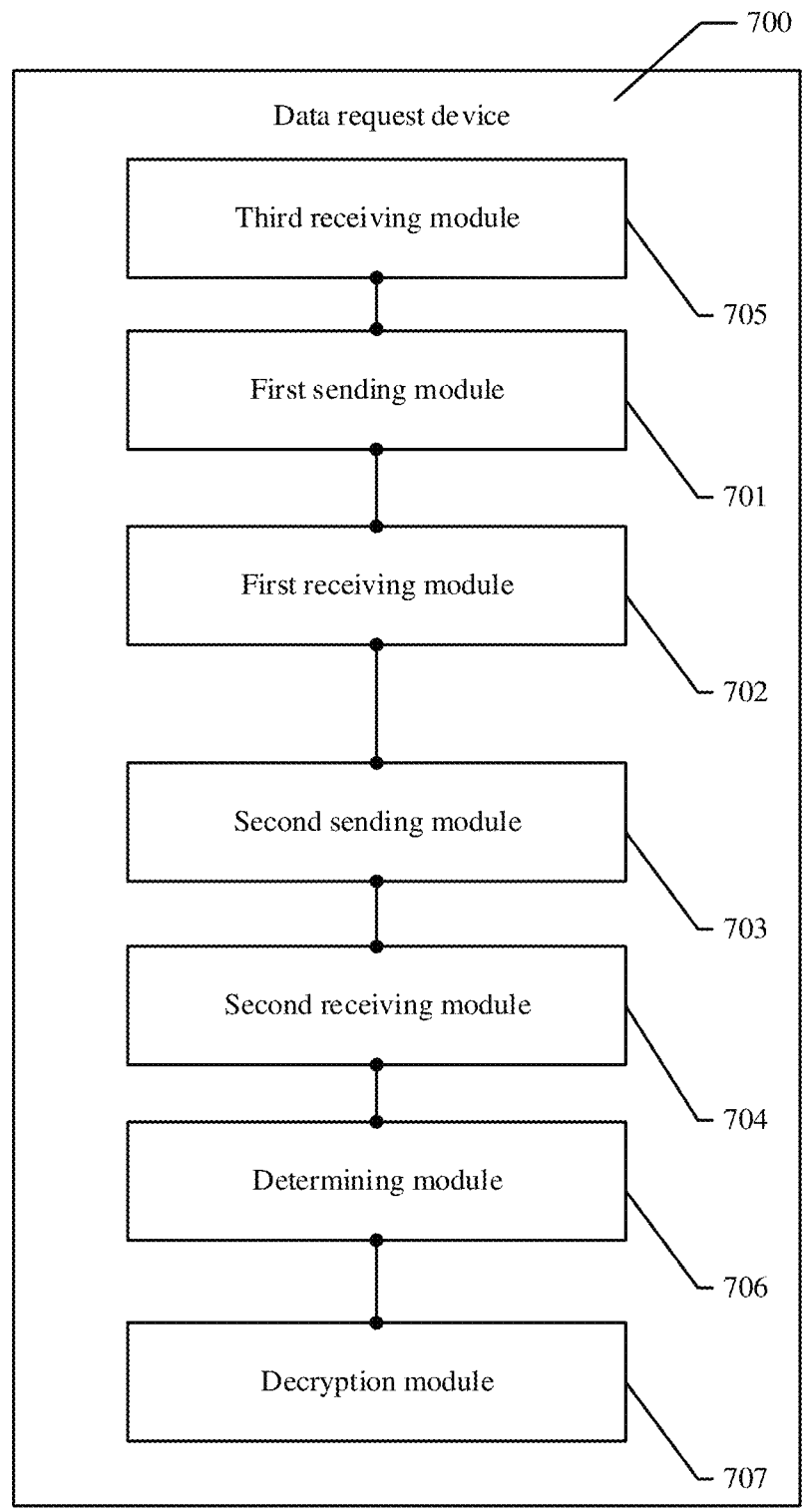
FIG. 7 is a schematic diagram of a structure of a data request device according to an embodiment of this application.

The following describes a data request device in an embodiment of this application. Refer to FIG. 7. An embodiment of this application provides a data request device 700. The data request device may be the data request device in FIG. 4 and FIG. 5. The data request device 700 includes the following items.

A first sending module 701 is configured to send a first request to a blockchain platform, where the first request indicates that the data request device needs to access a data storage device, and the first request includes signature information of the data request device, an access type, and an operator private key signature. For a specific implementation, refer to step 402 in FIG. 4 in which the data request device sends the first request to the blockchain platform. Details are not described herein again.

A first receiving module 702 is configured to receive first permission information sent by the blockchain platform, where the first permission information indicates whether the data request device has permission to access the data storage device, the permission is related to the signature information of the data request device, the access type, and an operator public key, and the operator public key uniquely corresponds to the operator private key. For a specific implementation, refer to step 403 in FIG. 4 in which the blockchain platform sends the first permission information to the data request device. Details are not described herein again.

A second sending module 703 is configured to send a second request to the data storage device if the first permission information indicates that the data request device has the permission to access the data storage device, where the second request includes an access address and an operator private key signature. For a specific implementation, refer to step 404 in FIG. 4 in which the data request device sends the second request to the data storage device. Details are not described herein again.

A second receiving module 704 is configured to receive acknowledgment information sent by the data storage device, where the acknowledgment information indicates that the data storage device has executed a task corresponding to the second request. For a specific implementation, refer to step 410 in FIG. 4 in which the data storage device sends the acknowledgment information to the data request device. Details are not described herein again.

A third receiving module 705 is configured to receive a third request sent by user equipment, where the third request indicates the data request device to send the first request to the blockchain platform, and the third request includes a user public key. For a specific implementation, refer to step 401 in FIG. 4 in which the user equipment sends the third request to the data request device. Details are not described herein again.

A determining module 706 is configured to determine a symmetric encryption key based on the user public key and the operator private key. For a specific implementation, refer to step 401 in FIG. 4 in which the user equipment sends the third request to the data request device. Details are not described herein again.

A decryption module 707 is configured to decrypt encrypted user data based on the symmetric encryption key. For a specific implementation, refer to step 410 in FIG. 4 in which the data storage device sends the acknowledgment information to the data request device. Details are not described herein again.

In this embodiment of this application, when a device of an operator-side device transfers information, a device that sends the information signs, based on the operator private key, the information that needs to be transferred or stored. After receiving the message, a device that receives the message may verify the signature based on the operator public key. Correspondingly, when a user-side device transfers information to the device of the operator-side device, the user-side device signs, based on the user private key, the information that needs to be transferred or stored, and the operator-side device that receives the message may verify the signature based on the user public key. Correspondingly, when the device of the operator-side device transfers information to the user-side device, the device of the operator-side device signs, based on the operator private key, the information that needs to be transferred or stored, and the user-side device that receives the message may verify the signature based on the operator public key.

In this embodiment of this application, the device of the operator-side device and the user-side device may perform data signature authentication according to the foregoing method each time data is transferred, or may not perform data signature authentication, but only transfer information that needs to be transferred or stored. This is not specifically limited herein. In this embodiment of this application, the device of the operator-side device includes a data request device (when the device is not user equipment), a blockchain platform, and a data storage device, and the user-side device includes user equipment.

In this embodiment, the data request device 700 may perform an operation performed by the data request device in the embodiment shown in either of FIG. 4 and FIG. 5. Details are not described herein again.

Figure 8:
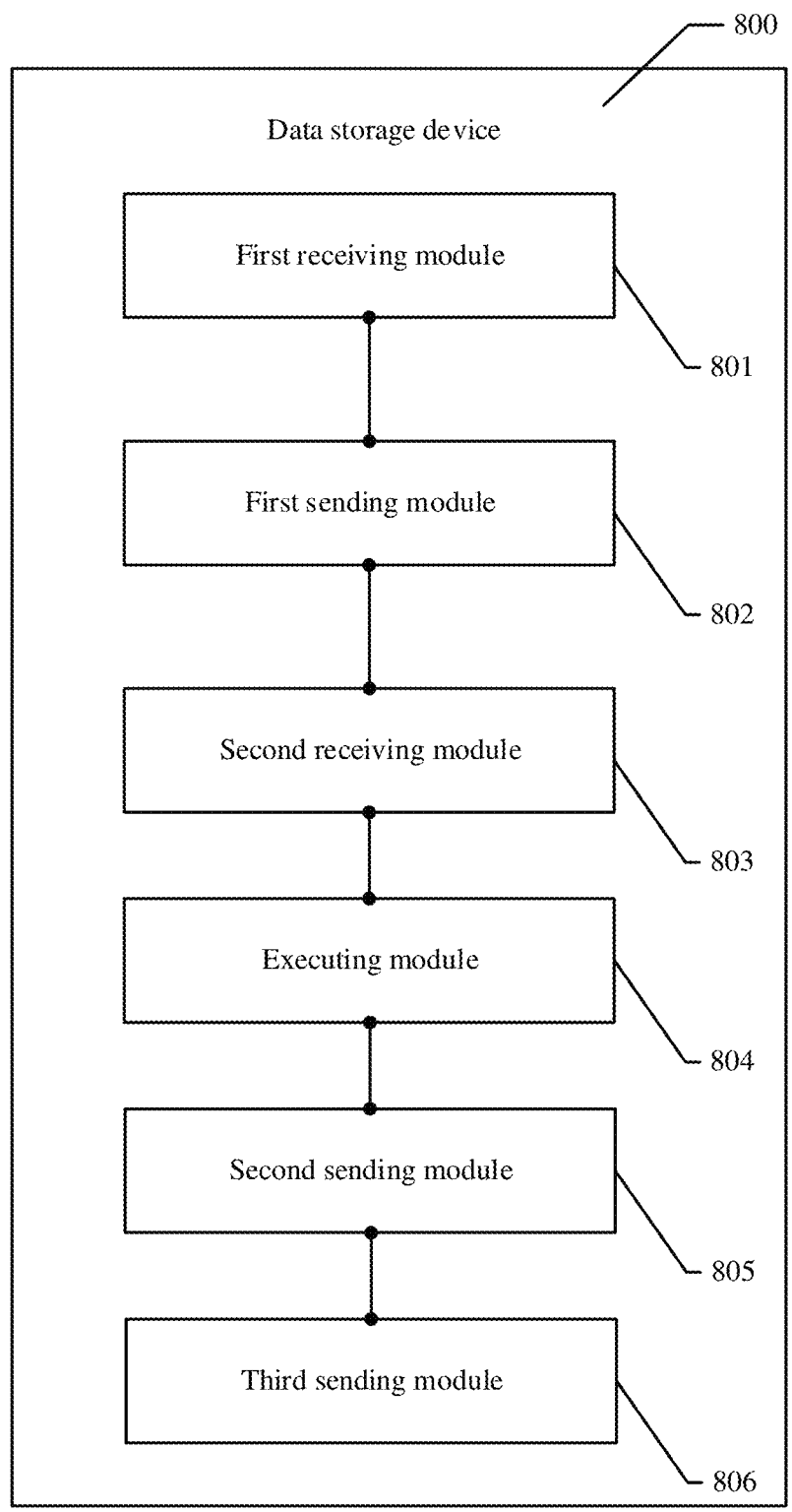
FIG. 8 is a schematic diagram of a structure of a data storage device according to an embodiment of this application.

The following describes a data storage device in an embodiment of this application. Refer to FIG. 8. An embodiment of this application provides a data storage device 800. The data storage device may be the data storage device in FIG. 4 and FIG. 5. The data storage device 800 includes the following items.

A first receiving module 801 is configured to receive a second request of a data request device, where the second request includes an access address and an operator private key signature. For a specific implementation, refer to step 404 in FIG. 4 in which the data request device sends the second request to the data storage device. Details are not described herein again.

A first sending module 802 is configured to send an access verification request to a blockchain platform, where the access verification request indicates the data request device to send the second request to the data storage device. For a specific implementation, refer to step 405 in FIG. 4 in which the data storage device sends the access verification request to the blockchain platform. Details are not described herein again.

A second receiving module 803 is configured to receive second permission information sent by the blockchain platform, where the second permission information indicates whether the data storage device can execute a task corresponding to the second request. For a specific implementation, refer to step 406 in FIG. 4 in which the blockchain platform sends the second permission information to the data storage device. Details are not described herein again.

An executing module 804 is configured to execute the corresponding task based on the second request if the second permission information indicates that the data storage device can execute the task corresponding to the second request. For a specific implementation, refer to step 407 in FIG. 4 in which the data storage device receives the second permission information and executes the task corresponding to the second request. Details are not described herein again.

A second sending module 805 is configured to send response information to the blockchain platform, where the response information indicates that the data storage device has executed the task corresponding to the second request. For a specific implementation, refer to step 408 in FIG. 4 in which the data storage device sends the response information to the blockchain platform. Details are not described herein again.

A third sending module 806 is configured to send acknowledgment information to the data request device, where the acknowledgment information indicates that the data storage device has executed the task corresponding to the second request. For a specific implementation, refer to step 410 in FIG. 4 in which the data storage device sends the acknowledgment information to the data request device. Details are not described herein again.

In this embodiment, the data storage device 800 may perform an operation performed by the data storage device in the embodiment shown in either of FIG. 4 and FIG. 5. Details are not described herein again.

Figure 9:
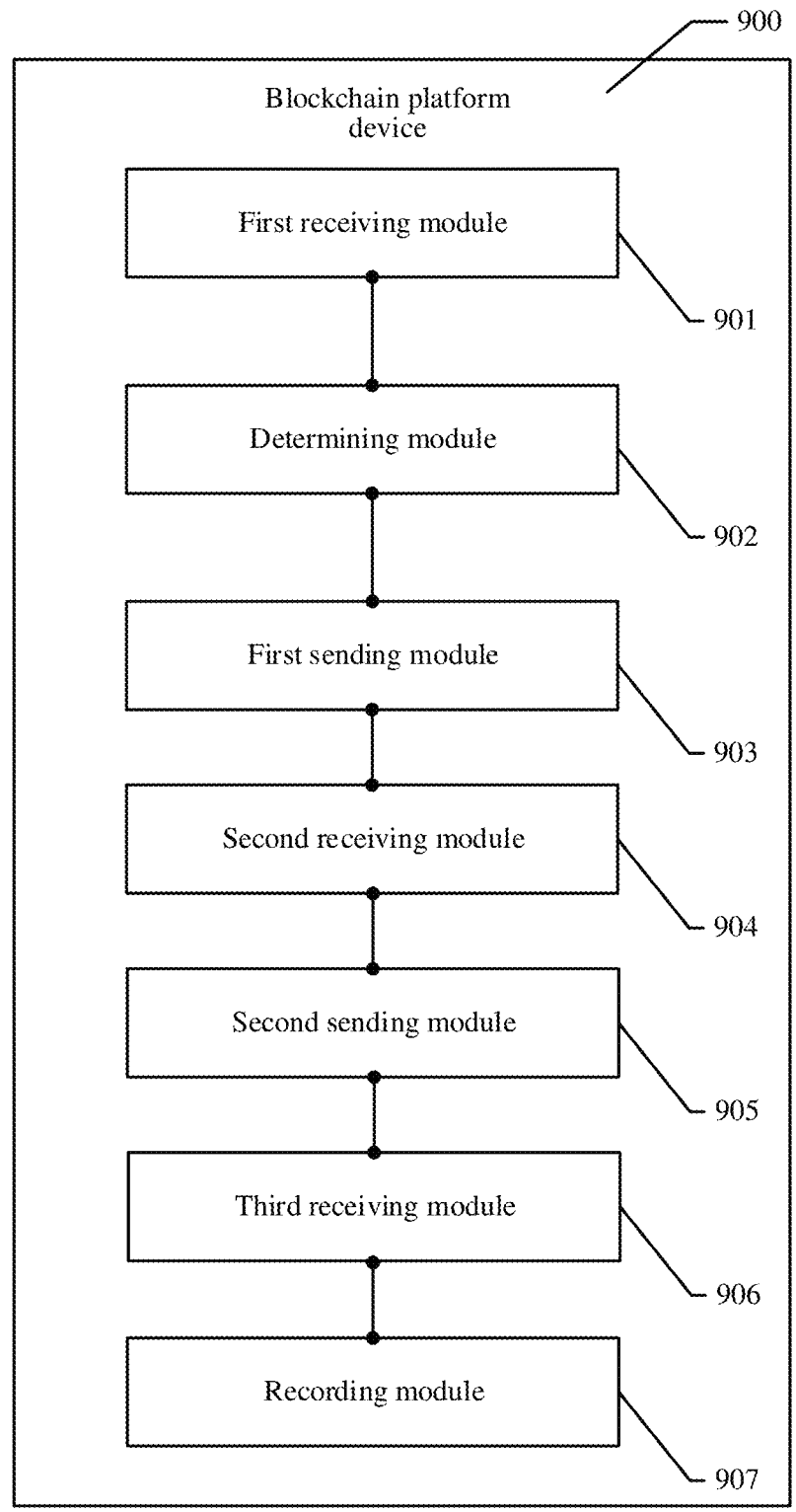
FIG. 9 is a schematic diagram of a structure of a blockchain platform device according to an embodiment of this application.

The following describes a blockchain platform device in an embodiment of this application. Refer to FIG. 9. An embodiment of this application provides a blockchain platform device 900. The blockchain platform device may be the blockchain platform device in FIG. 4 and FIG. 5. The blockchain platform device 900 includes the following items.

A first receiving module 901 is configured to receive a first request sent by a data request device, where the first request indicates that the data request device needs to access a data storage device, and the first request includes signature information of the data request device, an access type, and an operator private key signature. For a specific implementation, refer to step 402 in FIG. 4 in which the data request device sends the first request to the blockchain platform. Details are not described herein again.

A determining module 902 is configured to determine, based on the signature information of the data request device, the access type, and the operator private key signature, whether the data request device can access the data storage device. For a specific implementation, refer to step 403 in FIG. 4 in which the blockchain platform sends the first permission information to the data request device. Details are not described herein again.

A first sending module 903 is configured to send first permission information to the data request device, where the first permission information indicates whether the data request device has permission to access the data storage device. For a specific implementation, refer to step 403 in FIG. 4 in which the blockchain platform sends the first permission information to the data request device. Details are not described herein again.

A second receiving module 904 is configured to receive an access verification request sent by the data storage device, where the access verification request indicates the data request device to send a second request to the data storage device. For a specific implementation, refer to step 405 in FIG. 4 in which the data storage device sends the access verification request to the blockchain platform. Details are not described herein again.

A second sending module 905 is configured to send second permission information to the data storage device if a blockchain platform determines that the data request device can access the data storage device, where the second permission information indicates that the data storage device can execute a task corresponding to the second request. For a specific implementation, refer to step 406 in FIG. 4 in which the blockchain platform sends the second permission information to the data storage device. Details are not described herein again.

A third receiving module 906 is configured to receive response information sent by the data storage device, where the response information indicates that the data storage device has executed the task corresponding to the second request. For a specific implementation, refer to step 408 in FIG. 4 in which the data storage device sends the response information to the blockchain platform. Details are not described herein again.

A recording module 907 is configured to record, into a distributed ledger based on the response message, that the data storage device has executed the task corresponding to the second request. For a specific implementation, refer to step 409 in FIG. 4 in which the blockchain platform receives the response information and records the response information into the distributed ledger. Details are not described herein again.

In this embodiment, the blockchain platform device 900 may perform an operation performed by the blockchain platform device in the embodiment shown in either of FIG. 4 and FIG. 5. Details are not described herein again.

Figure 10:
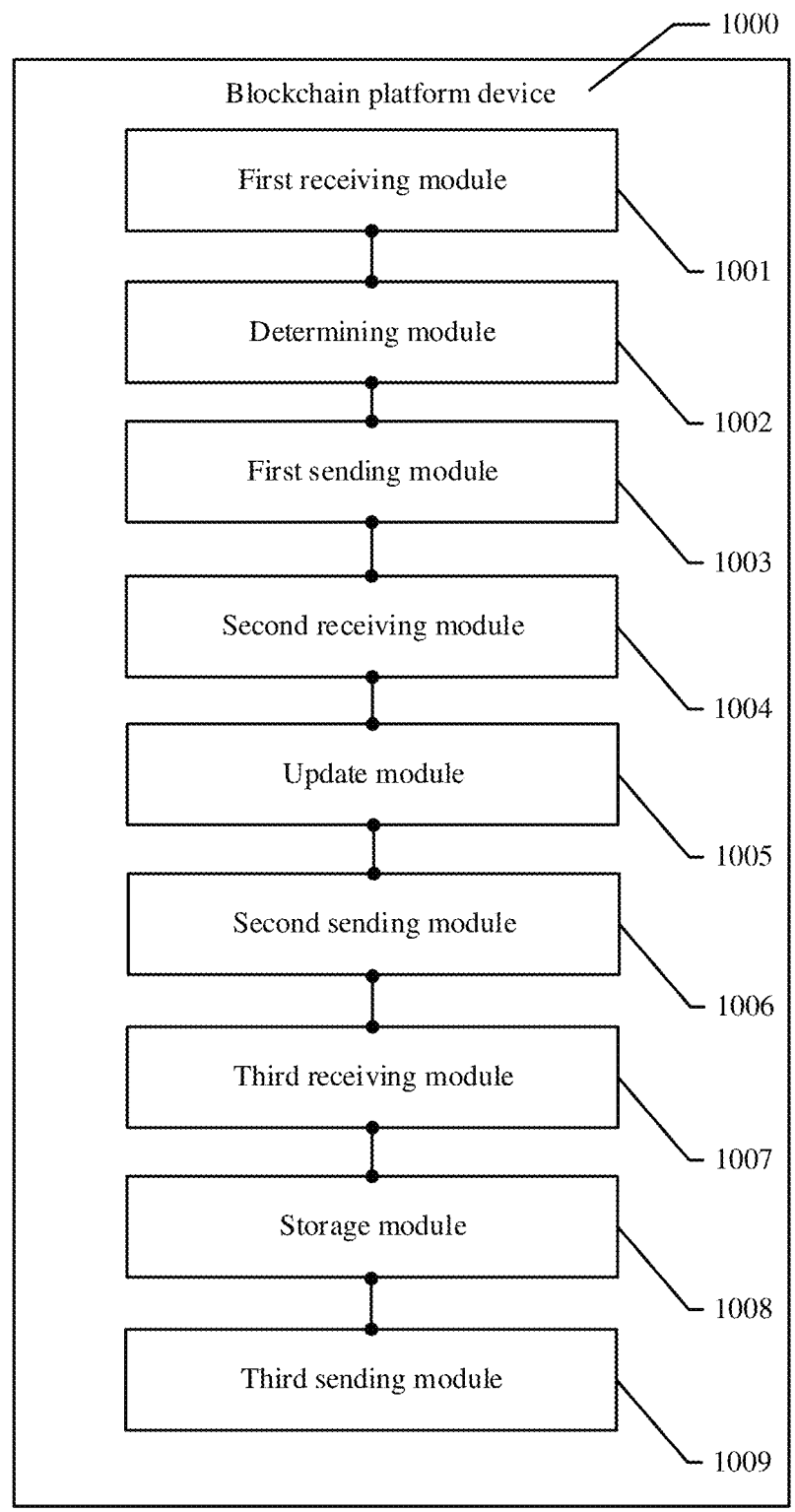
FIG. 10 is a schematic diagram of another structure of a blockchain platform device according to an embodiment of this application.

The following describes a blockchain platform device in an embodiment of this application. Refer to FIG. 10. An embodiment of this application provides a blockchain platform device 1000. The blockchain platform device may be the blockchain platform device in FIG. 6. The blockchain platform device 1000 includes the following items.

A first receiving module 1001 is configured to receive a first key update request sent by a data request device, where the first key update request indicates that the data request device needs a data storage device to update first user data related to a first key of a user to second user data related to a second key of the user, and the key update request includes signature information of the data request device, an access type, a second public key of the user encrypted based on an operator private key, and a user root private key signature. For a specific implementation, refer to step 602 in FIG. 6 in which the data request device sends the first key update request to the blockchain platform. Details are not described herein again.

A determining module 1002 is configured to determine, based on a user root public key and a first public key of the user, whether the data request device has permission for the data storage device to update the first user data to the second user data. For a specific implementation, refer to step 603 in FIG. 6 in which the blockchain platform determines permission of the data request device. Details are not described herein again.

A first sending module 1003 is configured to send a second key update request to the data storage device if the blockchain platform determines that the data request device has the permission, where the second key update request indicates the data storage device to send the first user data to the blockchain platform. For a specific implementation, refer to step 604 in FIG. 6 in which the blockchain platform sends the second key update request to the data storage device. Details are not described herein again.

A second receiving module 1004 is configured to receive a first response message sent by the data storage device, where the first response message includes the first user data. For a specific implementation, refer to step 605 in FIG. 6 in which the blockchain platform receives the first response message sent by the user data storage device. Details are not described herein again.

An update module 1005 is configured to update the first user data encrypted based on a first symmetric encryption key to the second user data encrypted based on a second symmetric encryption key, where the first symmetric encryption key is related to the first key of the user, and the second symmetric encryption key is related to the second key of the user. For a specific implementation, refer to step 606 in FIG. 6 in which the blockchain platform updates the first user data to the second user data. Details are not described herein again.

A second sending module 1006 is configured to send a third request to the data storage device, where the third request includes the second user data, and the third request indicates the data storage device to store the second user data. For a specific implementation, refer to step 607 in FIG. 6 in which the blockchain platform sends the third request to the data storage device. Details are not described herein again.

A third receiving module 1007 is configured to receive a second response message sent by the data storage device, where the second response message indicates that the data storage device has stored the second user data. For a specific implementation, refer to step 608 in FIG. 6 in which the blockchain platform receives the second response message sent by the data storage device. Details are not described herein again.

A storage module 1008 is configured to record, into a distributed ledger, that the data storage device has stored the second user data. For a specific implementation, refer to step 609 in FIG. 6 in which the blockchain platform receives the response information and records the response information into the distributed ledger. Details are not described herein again.

A third sending module 1009 is configured to send an acknowledgment message to the data request device, where the acknowledgment message indicates that the blockchain platform has updated the first user data to the second user data. For a specific implementation, refer to step 610 in FIG. 6 in which the blockchain platform sends the acknowledgment message to the data request device. Details are not described herein again.

In this embodiment, the blockchain platform device 1000 may perform an operation performed by the blockchain platform device in the embodiment shown in FIG. 6. Details are not described herein again.

Figure 11:
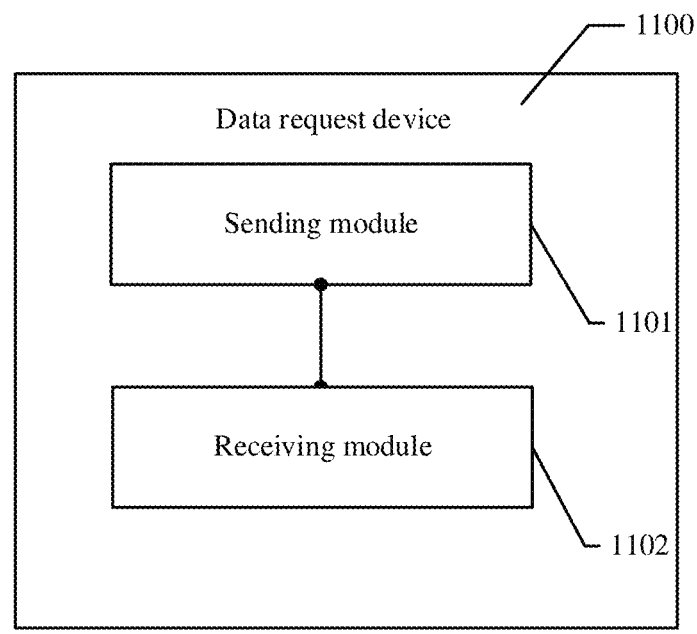
FIG. 11 is a schematic diagram of another structure of a data request device according to an embodiment of this application.

The following describes a data request device in an embodiment of this application. Refer to FIG. 11. An embodiment of this application provides a data request device 1100. The data request device may be the data request device in FIG. 6. The data request device 1100 includes the following items.

A sending module 1101 is configured to send a first key update request to a blockchain platform, where the first key update request indicates that the data request device needs a data storage device to update first user data encrypted based on a first key of a user to second user data encrypted based on a second key of the user, and the first key update request includes signature information of the data request device, an access type, a new public key of the user encrypted based on an operator private key, and a user root private key signature. For a specific implementation, refer to step 601 in FIG. 6 in which the data request device determines the second key pair of the user and the second symmetric encryption key. Details are not described herein again.

A receiving module 1102 is configured to receive an acknowledgment message sent by the blockchain platform, where the acknowledgment message indicates that the data storage device has updated the first user data to the second user data. For a specific implementation, refer to step 610 in FIG. 6 in which the blockchain platform sends the acknowledgment message to the data request device. Details are not described herein again.

Figure 12:
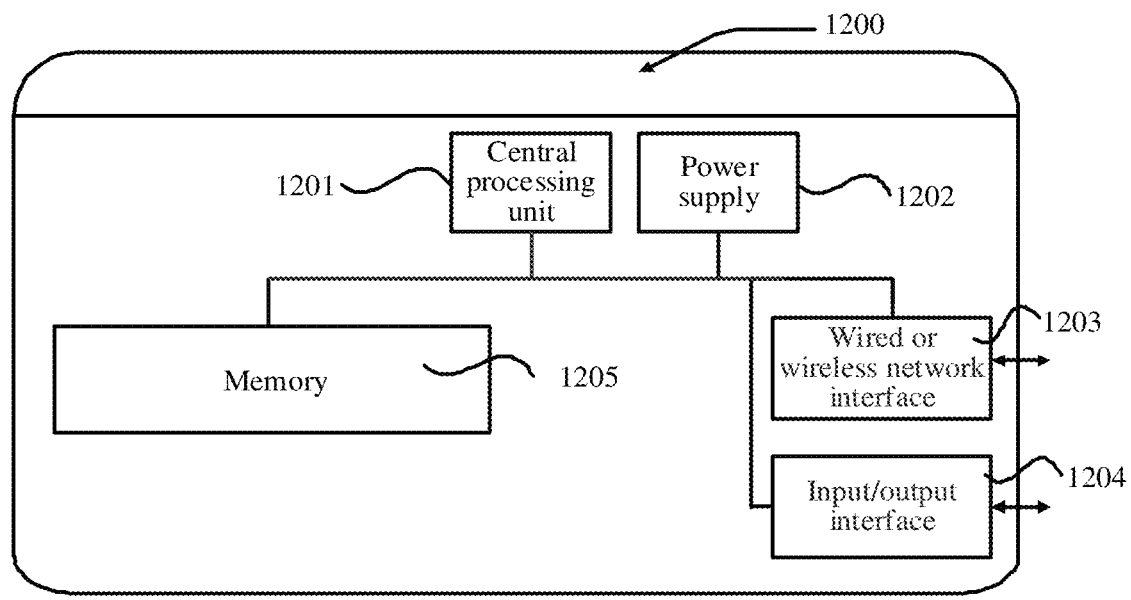
FIG. 12 is a schematic diagram of another structure of a data request device according to an embodiment of this application.

FIG. 12 is a schematic diagram of a structure of a data request device according to an embodiment of this application. The data request device 1200 may include one or more central processing units (central processing units, CPUs) 1201 and a memory 1205. The memory 1205 stores one or more application programs or data.

The memory 1205 may be a volatile memory or a persistent memory. The program stored in the memory 1205 may include one or more modules, and each module may include a series of instruction operations on the data request device. Further, the central processing unit 1201 may be configured to communicate with the memory 1205, and perform, on the data request device 1200, the series of instruction operations in the memory 1205.

The central processing unit 1201 is configured to execute the computer program in the memory 1205, so that the data request device 1200 is configured to perform the following operations. The data request device sends a first request to a blockchain platform, where the first request indicates that the data request device needs to access a data storage device, and the first request includes signature information of the data request device, an access type, and an operator private key signature. The data request device receives first permission information sent by the blockchain platform, where the first permission information indicates whether the data request device has permission to access the data storage device, the permission is related to the signature information of the data request device, the access type, and an operator public key, and the operator public key uniquely corresponds to an operator private key. The data request device sends a second request to the data storage device if the first permission information indicates that the data request device has the permission to access the data storage device, where the second request includes an access address and the operator private key signature. For a specific implementation, refer to step 401 to step 411 in the embodiment shown in FIG. 4. Details are not described herein again.

The data request device 1200 may further include one or more power supplies 1202, one or more wired or wireless network interfaces 1203, one or more input/output interfaces 1204, and/or one or more operating systems, such as Windows Server™, Mac OS X™, Unix™, Linux™, and FreeBSD™.

The data request device 1200 may perform an operation performed by the data request device in either of embodiments shown in FIG. 4 and FIG. 5. Details are not described herein again.

Figure 13:
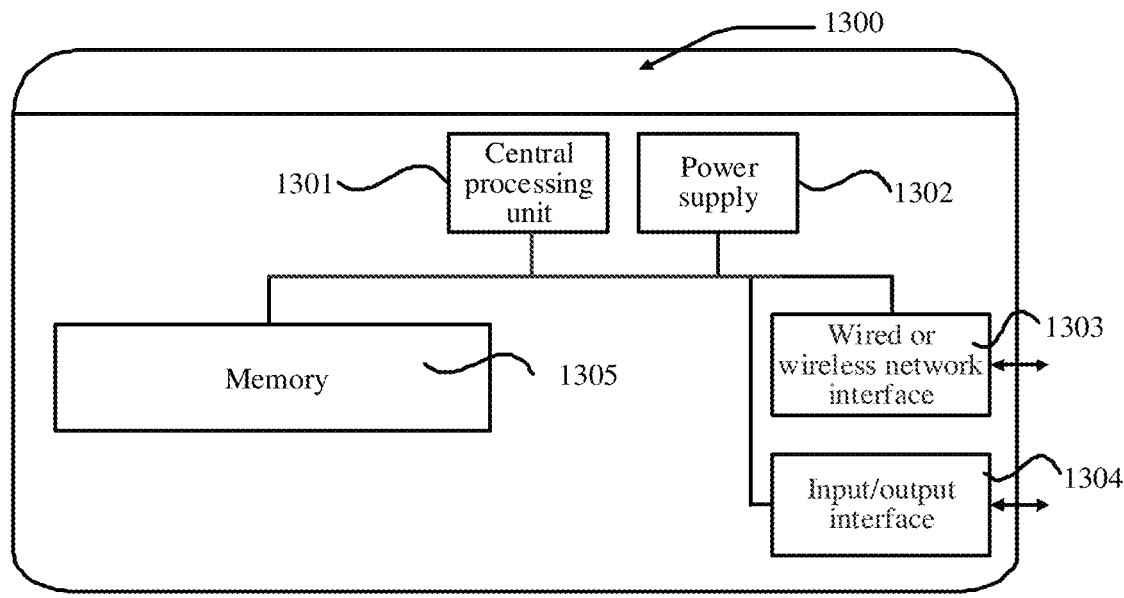
FIG. 13 is a schematic diagram of another structure of a data storage device according to an embodiment of this application.

FIG. 13 is a schematic diagram of a structure of a data storage device according to an embodiment of this application. The data storage device 1300 may include one or more central processing units (central processing units, CPUs) 1301 and a memory 1305. The memory 1305 stores one or more application programs or data.

The memory 1305 may be a volatile memory or a persistent memory. The program stored in the memory 1305 may include one or more modules, and each module may include a series of instruction operations on the data storage device. Further, the central processing unit 1301 may be configured to communicate with the memory 1305, and perform, on the data storage device 1300, the series of instruction operations in the memory 1305.

The central processing unit 1301 is configured to execute the computer program in the memory 1305, so that the data storage device 1300 is configured to perform the following operations. The data storage device receives a second request of a data request device, where the second request includes an access address and an operator private key signature. The data storage device sends an access verification request to a blockchain platform, where the access verification request indicates the data request device to send the second request to the data storage device. The data storage device receives second permission information sent by the blockchain platform, where the second permission information indicates whether the data storage device can execute a task corresponding to the second request. If the second permission information indicates that the data storage device can execute the task corresponding to the second request, the data storage device executes the corresponding task based on the second request. For a specific implementation, refer to step 401 to step 411 in the embodiment shown in FIG. 4. Details are not described herein again.

The data storage device 1300 may further include one or more power supplies 1302, one or more wired or wireless network interfaces 1303, one or more input/output interfaces 1304, and/or one or more operating systems, such as Windows Server™, Mac OS X™, Unix™, Linux™, and FreeBSD™.

The data storage device 1300 may perform an operation performed by the data storage device in either of embodiments shown in FIG. 4 and FIG. 5. Details are not described herein again.

Figure 14:
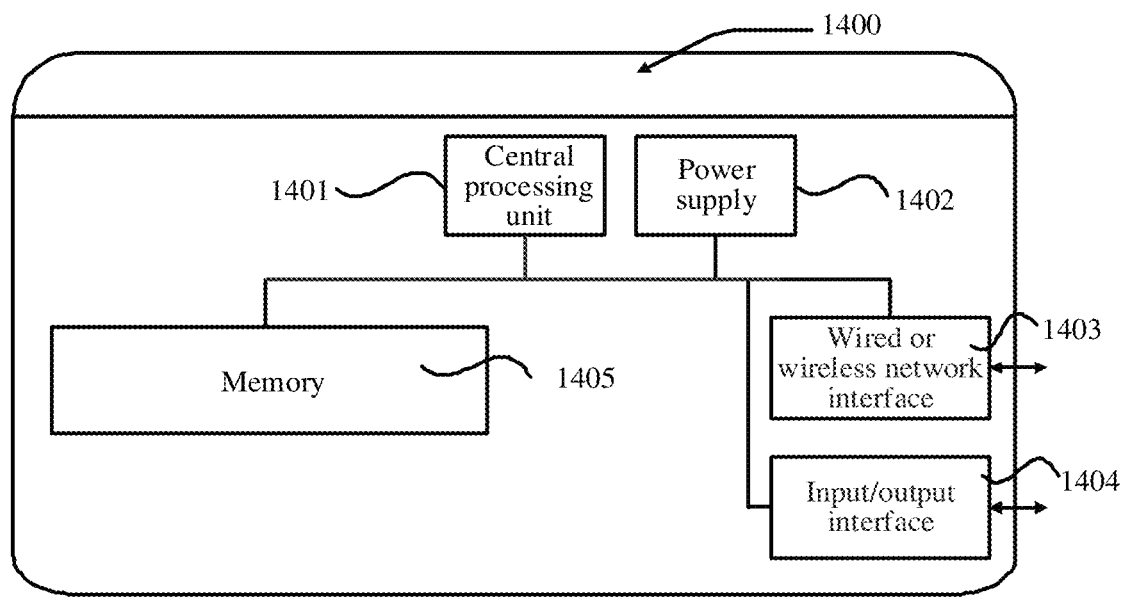
FIG. 14 is a schematic diagram of another structure of a blockchain platform device according to an embodiment of this application.

FIG. 14 is a schematic diagram of a structure of a blockchain platform device according to an embodiment of this application. The blockchain platform device 1400 may include one or more central processing units (central processing units, CPUs) 1401 and a memory 1405. The memory 1405 stores one or more application programs or data.

The memory 1405 may be a volatile memory or a persistent memory. The program stored in the memory 1405 may include one or more modules, and each module may include a series of instruction operations on the blockchain platform device. Further, the central processing unit 1401 may be configured to communicate with the memory 1405, and perform, on the blockchain platform device 1400, the series of instruction operations in the memory 1405.

The central processing unit 1401 is configured to execute the computer program in the memory 1405, so that the blockchain platform device 1400 is configured to perform the following operations. The blockchain platform receives a first request sent by a data request device, where the first request indicates that the data request device needs to access a data storage device, and the first request includes signature information of the data request device, an access type, and an operator private key signature. The blockchain platform determines, based on the signature information of the data request device, the access type, and the operator private key signature, whether the data request device can access the data storage device. The blockchain platform sends first permission information to the data request device, where the first permission information indicates whether the data request device has permission to access the data storage device. The blockchain platform receives an access verification request sent by the data storage device, where the access verification request indicates the data request device to send a second request to the data storage device. If the blockchain platform determines that the data request device can access the data storage device, the blockchain platform sends second permission information to the data storage device, where the second permission information indicates that the data storage device can execute a task corresponding to the second request. For a specific implementation, refer to step 401 to step 411 in the embodiment shown in FIG. 4. Details are not described herein again.

The blockchain platform device 1400 may further include one or more power supplies 1402, one or more wired or wireless network interfaces 1403, one or more input/output interfaces 1404, and/or one or more operating systems, such as Windows Server™, Mac OS X™, Unix™, Linux™, and FreeBSD™.

The blockchain platform device 1400 may perform an operation performed by the blockchain platform device in either of embodiments shown in FIG. 4 and FIG. 5. Details are not described herein again.

Figure 15:
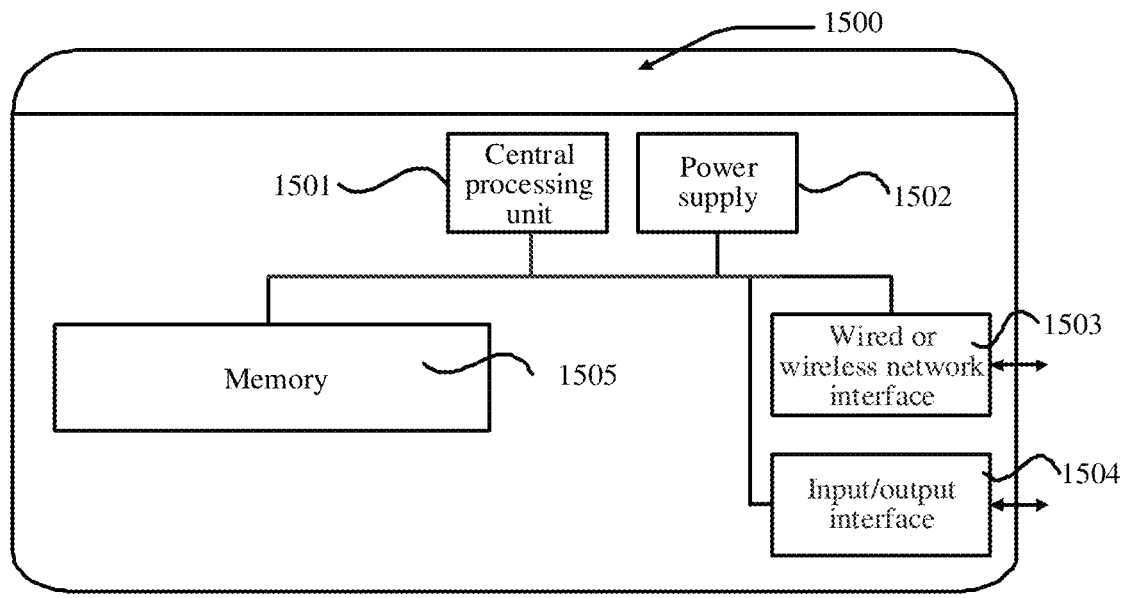
FIG. 15 is a schematic diagram of another structure of a blockchain platform device according to an embodiment of this application.

FIG. 15 is a schematic diagram of a structure of a blockchain platform device according to an embodiment of this application. The blockchain platform device 1500 may include one or more central processing units (central processing units, CPUs) 1501 and a memory 1505. The memory 1505 stores one or more application programs or data.

The memory 1505 may be a volatile memory or a persistent memory. The program stored in the memory 1505 may include one or more modules, and each module may include a series of instruction operations on the blockchain platform device. Further, the central processing unit 1501 may be configured to communicate with the memory 1505, and perform, on the blockchain platform device 1500, the series of instruction operations in the memory 1505.

The central processing unit 1501 is configured to execute the computer program in the memory 1505, so that the blockchain platform device 1500 is configured to perform the following operations. The blockchain platform receives a first key update request sent by a data request device, where the first key update request indicates that the data request device needs a data storage device to update first user data related to a first key of a user to second user data related to a second key of the user, and the key update request includes signature information of the data request device, an access type, a second public key of the user encrypted based on an operator private key, and a user root private key signature. The blockchain platform determines, based on a user root public key and a first public key of the user, whether the data request device has permission for the data storage device to update the first user data to the second user data. If the blockchain platform determines that the data request device has the permission, the blockchain platform sends a second key update request to the data storage device, where the second key update request indicates the data storage device to send the first user data to the blockchain platform. The blockchain platform receives a first response message sent by the data storage device, where the first response message includes the first user data. The blockchain platform updates the first user data encrypted based on a first symmetric encryption key to the second user data encrypted based on a second symmetric encryption key, where the first symmetric encryption key is related to the first key of the user, and the second symmetric encryption key is related to the second key of the user. The blockchain platform sends a third request to the data storage device, where the third request includes the second user data, and the third request indicates the data storage device to store the second user data. For a specific implementation, refer to step 601 to step 610 in the embodiment shown in FIG. 6. Details are not described herein again.

The blockchain platform device 1500 may further include one or more power supplies 1502, one or more wired or wireless network interfaces 1503, one or more input/output interfaces 1504, and/or one or more operating systems, such as Windows Server™, Mac OS X™, Unix™, Linux™, and FreeBSD™.

The blockchain platform device 1500 may perform an operation performed by the blockchain platform device in the embodiment shown in FIG. 6. Details are not described herein again.

Figure 16:
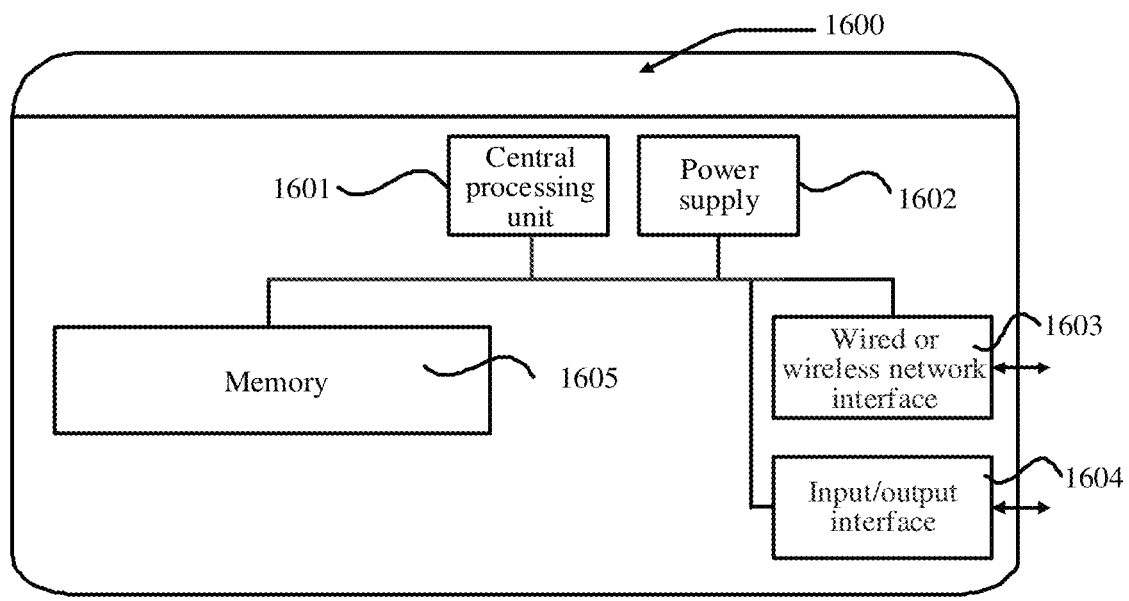
FIG. 16 is a schematic diagram of another structure of a data request device according to an embodiment of this application.

FIG. 16 is a schematic diagram of a structure of a data request device according to an embodiment of this application. The data request device 1600 may include one or more central processing units (central processing units, CPUs) 1601 and a memory 1605. The memory 1605 stores one or more application programs or data.

The memory 1605 may be a volatile memory or a persistent memory. The program stored in the memory 1605 may include one or more modules, and each module may include a series of instruction operations on the data request device. Further, the central processing unit 1601 may be configured to communicate with the memory 1605, and perform, on the data request device 1600, the series of instruction operations in the memory 1605.

The central processing unit 1601 is configured to execute the computer program in the memory 1605, so that the data request device 1600 is configured to perform the following operations. The data request device sends a first key update request to a blockchain platform, where the first key update request indicates that the data request device needs a data storage device to update first user data encrypted based on a first key of a user to second user data encrypted based on a second key of the user, and the first key update request includes signature information of the data request device, an access type, a new public key of the user encrypted based on an operator private key, and a user root private key signature. The data request device receives an acknowledgment message sent by the blockchain platform, where the acknowledgment message indicates that the data storage device has updated the first user data to the second user data. For a specific implementation, refer to step 601 to step 610 in the embodiment shown in FIG. 6. Details are not described herein again.

The data request device 1600 may further include one or more power supplies 1602, one or more wired or wireless network interfaces 1603, one or more input/output interfaces 1604, and/or one or more operating systems, such as Windows Server™, Mac OS X™, Unix™, Linux™, and FreeBSD™.

The data request device 1600 may perform an operation performed by the data request device in the embodiment shown in FIG. 6. Details are not described herein again.

Figure 17:
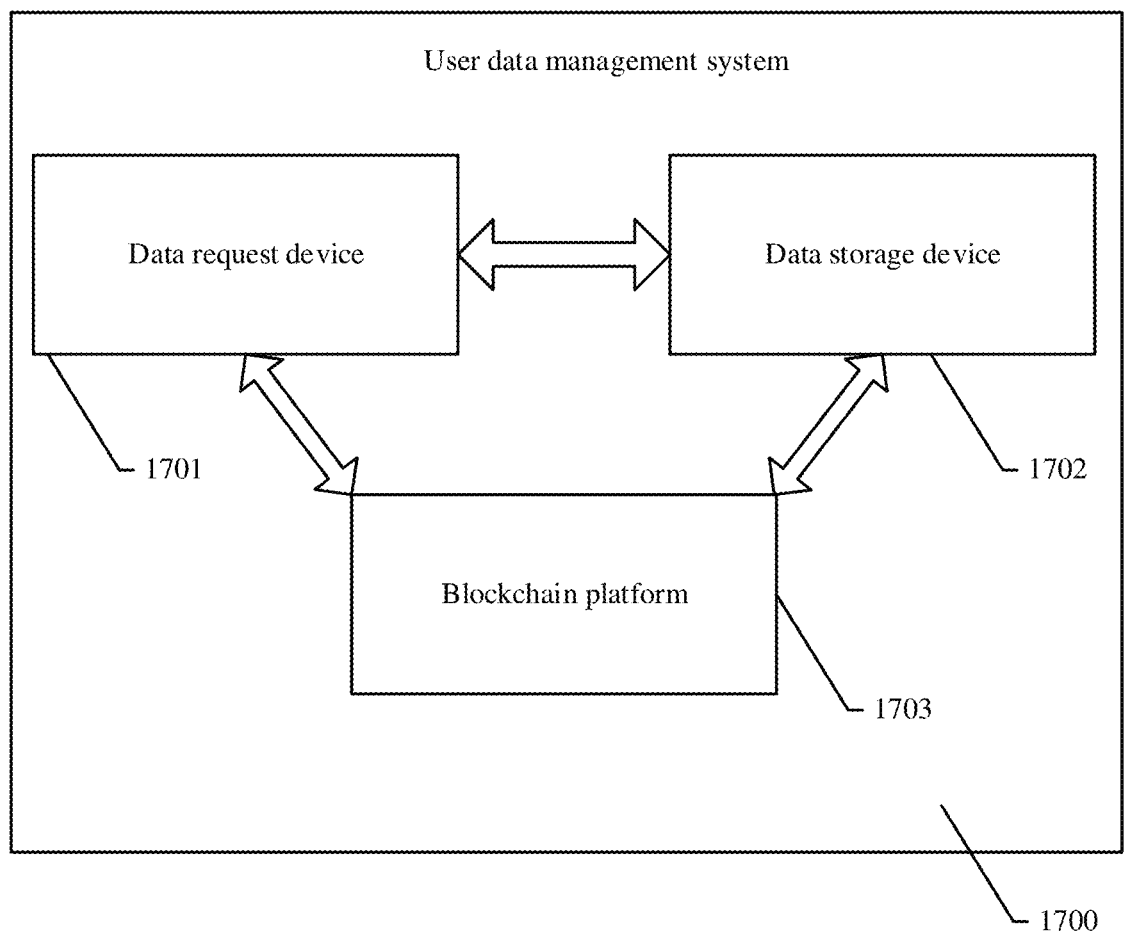
FIG. 17 is a schematic diagram of a structure of a user data management system according to an embodiment of this application.

FIG. 17 is a schematic diagram of a structure of a user data management system 1700 according to an embodiment of this application. The user data management system 1700 may include a data request device 1701, a data storage device 1702, and a blockchain platform device 1703. The data request device 1701 may perform an operation performed by the data request device in either of embodiments shown in FIG. 4 and FIG. 5. The data storage device 1702 may perform an operation performed by the data storage device in either of embodiments shown in FIG. 4 and FIG. 5. The blockchain platform device 1703 may perform an operation performed by the blockchain platform device in either of embodiments shown in FIG. 4 and FIG. 5.

Figure 18:
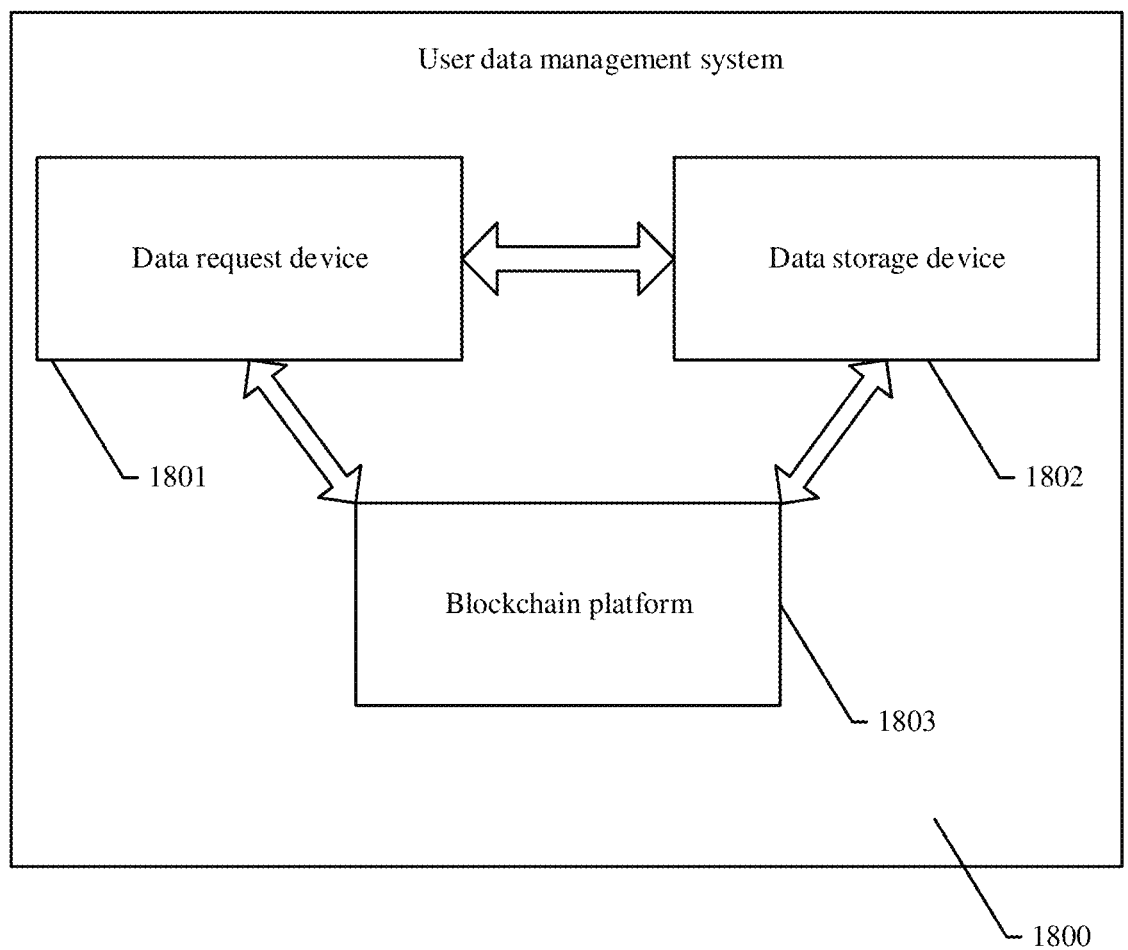
FIG. 18 is a schematic diagram of another structure of a user data management system according to an embodiment of this application.

FIG. 18 is a schematic diagram of a structure of a user data management system 1800 according to an embodiment of this application. The user data management system 1800 may include a data request device 1801, a data storage device 1802, and a blockchain platform device 1803. The data request device 1801 may perform an operation performed by the data request device in any one of embodiments shown in FIG. 4 to FIG. 8. The data storage device 1802 may perform an operation performed by the data storage device in the embodiment shown in FIG. 6. The blockchain platform device 1803 may perform an operation performed by the blockchain platform device in the embodiment shown in FIG. 6.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in the form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

What is claimed is:

1. A user data management method, comprising:
    sending, by a data request device, a first request to a blockchain platform, wherein the first request indicates that the data request device needs to access a data storage device, and the first request comprises signature information of the data request device and an access type;
    receiving, by the data request device, first permission information sent by the blockchain platform, wherein the first permission information indicates whether the data request device has permission to access the data storage device, and the permission is related to the signature information of the data request device and the access type; and
    sending, by the data request device, a second request to the data storage device if the first permission information indicates that the data request device has the permission to access the data storage device, wherein the second request comprises an access address.

2. The method according to claim 1, wherein the access type comprises data writing and data reading; and
    if the access type is data writing, the first request further comprises the access address; or
    if the access type is data reading, the first permission information comprises the access address.

3. The method according to claim 1, wherein after the sending, by the data request device, a second request to the data storage device, the method further comprises:
    receiving, by the data request device, acknowledgment information sent by the data storage device, wherein the acknowledgment information indicates that the data storage device has executed a task corresponding to the second request.

4. The method according to claim 3, wherein before the sending, by a data request device, a first request to a blockchain platform, the method further comprises:
    receiving, by the data request device, a third request sent by user equipment, wherein the third request indicates the data request device to send the first request to the blockchain platform.

5. The method according to claim 4, wherein the signature information of the data request device comprises signature information of the user equipment.

6. A user data management method, comprising:
    receiving, by a data storage device, a second request of a data request device, wherein the second request comprises an access address;
    sending, by the data storage device, an access verification request to a blockchain platform, wherein the access verification request indicates the data request device to send the second request to the data storage device;
    receiving, by the data storage device, second permission information sent by the blockchain platform, wherein the second permission information indicates whether the data storage device is capable of executing a task corresponding to the second request; and
    executing, by the data storage device, the corresponding task based on the second request if the second permission information indicates that the data storage device is capable of executing the task corresponding to the second request.

7. The method according to claim 6, wherein after the executing, by the data storage device, the corresponding task based on the second request, the method further comprises:
    sending, by the data storage device, response information to the blockchain platform, wherein the response information indicates that the data storage device has executed the task corresponding to the second request.

8. The method according to claim 6, wherein after the executing, by the data storage device, the corresponding task based on the second request, the method further comprises:
    sending, by the data storage device, acknowledgment information to the data request device, wherein the acknowledgment information indicates that the data storage device has executed the task corresponding to the second request.

9. A user data management method, comprising:
    receiving, by a blockchain platform, a first request sent by a data request device, wherein the first request indicates that the data request device needs to access a data storage device, and the first request comprises signature information of the data request device and an access type;
    determining, by the blockchain platform based on the signature information of the data request device and the access type, whether the data request device is capable of accessing the data storage device;
    sending, by the blockchain platform, first permission information to the data request device, wherein the first permission information indicates whether the data request device is capable of accessing the data storage device;
    receiving, by the blockchain platform, an access verification request sent by the data storage device, wherein the access verification request indicates the data request device to send a second request to the data storage device; and
    sending, by the blockchain platform, second permission information to the data storage device if the blockchain platform determines that the data request device is capable of accessing the data storage device, wherein the second permission information indicates that the data storage device is capable of executing a task corresponding to the second request.

10. The method according to claim 9, wherein after the sending, by the blockchain platform, second permission information to the data storage device, the method further comprises:
    receiving, by the blockchain platform, response information sent by the data storage device, wherein the response information indicates that the data storage device has executed the task corresponding to the second request; and recording, by the blockchain platform into a distributed ledger based on the response information, that the data storage device has executed the task corresponding to the second request.

11. The method according to claim 9, wherein if the access type is data reading, the first permission information comprises an access address.

* * * * *